US012632805B2

(12) United States Patent
    Acharya

(10) Patent No.: US 12,632,805 B2
(45) Date of Patent: May 19, 2026

(54) SYSTEMS AND METHODS FOR MANAGING A PORTFOLIO OF ASSETS IN A FACILITY

(71) Applicant: HONEYWELL INTERNATIONAL INC., Charlotte, NC (US)

(72) Inventor: Bhabesh Acharya, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 35 days.

(21) Appl. No.: 18/523,944

(22) Filed: Nov. 30, 2023

(65) Prior Publication Data
    US 2025/0182003 A1     Jun. 5, 2025

(51) Int. Cl.
    *G06Q 10/0631* (2023.01)
(52) U.S. Cl.
    CPC ................................. *G06Q 10/0631* (2013.01)
(58) Field of Classification Search
    CPC .................................................. G06Q 10/0631
    See application file for complete search history.

(56) References Cited

U.S. PATENT DOCUMENTS

| 6,181,336 | B1 * | 1/2001 | Chiu | ........................ G06T 1/00 |
| | | | | 715/736 |
| 2008/0077512 | A1 * | 3/2008 | Grewal | ............... G06F 11/1448 |
| | | | | 705/28 |
| 2009/0192931 | A1 * | 7/2009 | Amiri | ................... G06Q 40/04 |
| | | | | 705/37 |

| 2009/0237253 | A1 * | 9/2009 | Neuwirth | ............. G06Q 10/087 |
| | | | | 705/28 |
| 2017/0185594 | A1 * | 6/2017 | Schulz | ................... G06Q 10/06 |
| 2025/0200290 | A1 * | 6/2025 | Birru | ....................... G06F 16/33 |

FOREIGN PATENT DOCUMENTS

| WO | WO-2006108162 A2 * | 10/2006 | ........ G06F 17/30011 |
| WO | WO-2007022279 A2 * | 2/2007 | ............. G06Q 50/08 |

OTHER PUBLICATIONS

Xiang et al (Digital Twin Enabled Asset Anomaly Detection for Building Facility Management), Dec. 2020, Science Direct, pp. 380-385. (Year: 2020).*

Ype et al "Kind of asset management: similarities", Aug. 2012, Asset resolution processing risk, pp. 1-2 (Year: 2012).*

* cited by examiner

*Primary Examiner* — Romain Jeanty

(74) *Attorney, Agent, or Firm* — Alston & Bird LLP

(57) ABSTRACT

Various embodiments described herein relate to systems and methods for managing assets in a facility. Initially, first data comprising first model data associated with a first asset is received. The first data is compared with second data to determine a first similarity score such that the second data comprises second model data associated with a second asset. Further, first and second telemetry data associated with the first and second assets, respectively are received. Stationarity of the first telemetry data with the second telemetry data is determined using one or more first tests. The stationarity facilitates determination of a second similarity score. Application of machine learning models on the first and second telemetry data determines a third similarity score. Similarity between the first and second assets is identified based on the first, second, and third similarity scores. Actions are provided for the first asset based at least on the similarity.

20 Claims, 12 Drawing Sheets

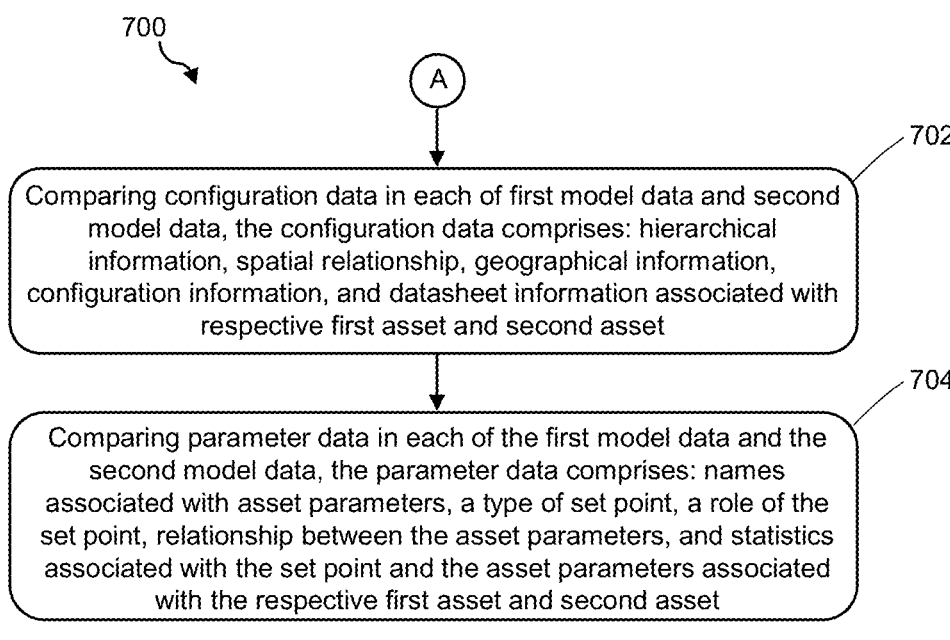

700

A

Comparing configuration data in each of first model data and second model data, the configuration data comprises: hierarchical information, spatial relationship, geographical information, configuration information, and datasheet information associated with respective first asset and second asset

702

Comparing parameter data in each of the first model data and the second model data, the parameter data comprises: names associated with asset parameters, a type of set point, a role of the set point, relationship between the asset parameters, and statistics associated with the set point and the asset parameters associated with the respective first asset and second asset

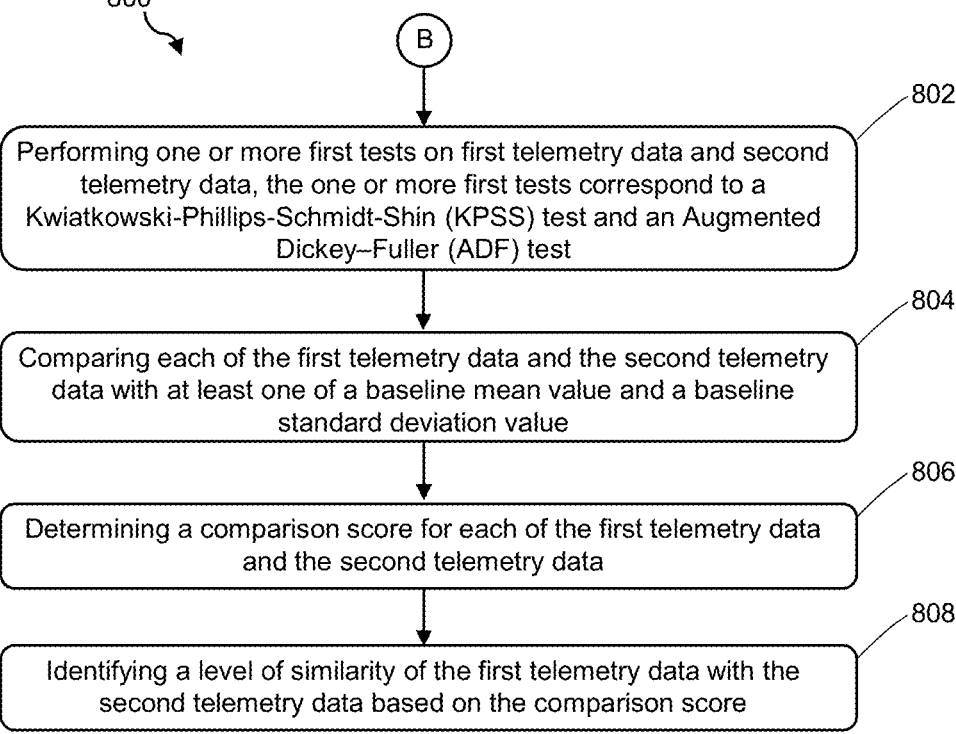

800

B

Performing one or more first tests on first telemetry data and second telemetry data, the one or more first tests correspond to a Kwiatkowski–Phillips–Schmidt–Shin (KPSS) test and an Augmented Dickey–Fuller (ADF) test

802

Comparing each of the first telemetry data and the second telemetry data with at least one of a baseline mean value and a baseline standard deviation value

804

Determining a comparison score for each of the first telemetry data and the second telemetry data

806

Identifying a level of similarity of the first telemetry data with the second telemetry data based on the comparison score

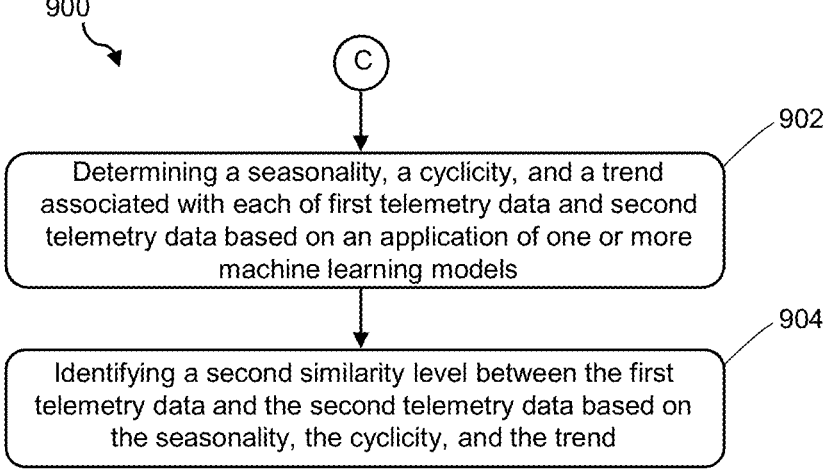

902

Determining a seasonality, a cyclicity, and a trend associated with each of first telemetry data and second telemetry data based on an application of one or more machine learning models

904

Identifying a second similarity level between the first telemetry data and the second telemetry data based on the seasonality, the cyclicity, and the trend

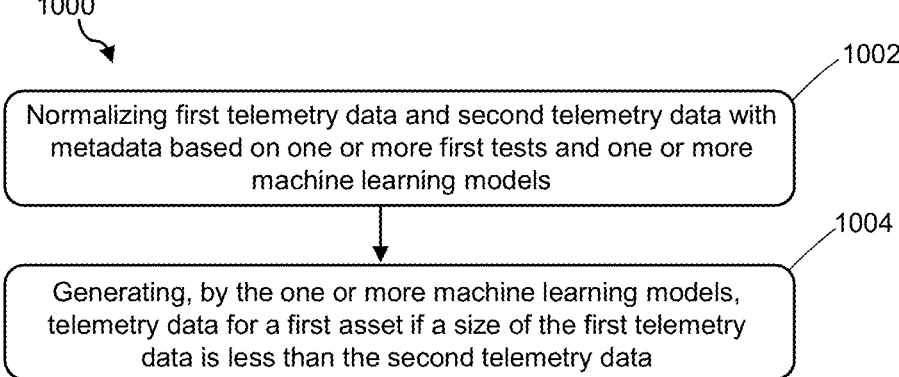

1002

Normalizing first telemetry data and second telemetry data with metadata based on one or more first tests and one or more machine learning models

1004

Generating, by the one or more machine learning models, telemetry data for a first asset if a size of the first telemetry data is less than the second telemetry data

SYSTEMS AND METHODS FOR MANAGING A PORTFOLIO OF ASSETS IN A FACILITY

TECHNICAL FIELD

The present disclosure generally relates to an asset management system. More particularly, the present disclosure relates to managing a portfolio of assets based on an inference of similarity and quality associated with the assets in a facility.

BACKGROUND

Often a facility (such as a building, a warehouse, a factory, a cleanroom, and/or the like) includes numerous portfolio of assets to perform different operations. Traditionally, workers with specialized domain knowledge are employed in the facility to manage such diverse portfolio of assets. However, managing assets based on worker domain knowledge has associated challenges. At times, an asset in the facility can be underperforming when compared to another asset in the facility. For example, an HVAC unit can be underperforming when compared to another HVAC unit. In this regard, the worker's domain knowledge may fail to identify an underlying cause for such performance of the HVAC unit. Further, there can be incoming assets that are to be newly added to the facility in addition to existing assets. In this regard, such assets need to be inspected if they are performing as per expectations and requirements. Though the workers can manually inspect certain external features, anomalies associated with internal components can go unobserved. Eventually, these challenges often result in unoptimized management of assets and/or under-utilization of resources of the facility. Accordingly, it becomes challenging to manage assets in the facility.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 illustrates a flowchart showing a method described in accordance with some example embodiments described herein.

FIG. 8 illustrates a flowchart showing a method described in accordance with some example embodiments described herein.

FIG. 9 illustrates a flowchart showing a method described in accordance with some example embodiments described herein.

FIG. 10 illustrates a flowchart showing a method described in accordance with some example embodiments described herein.

SUMMARY

Figure 1:
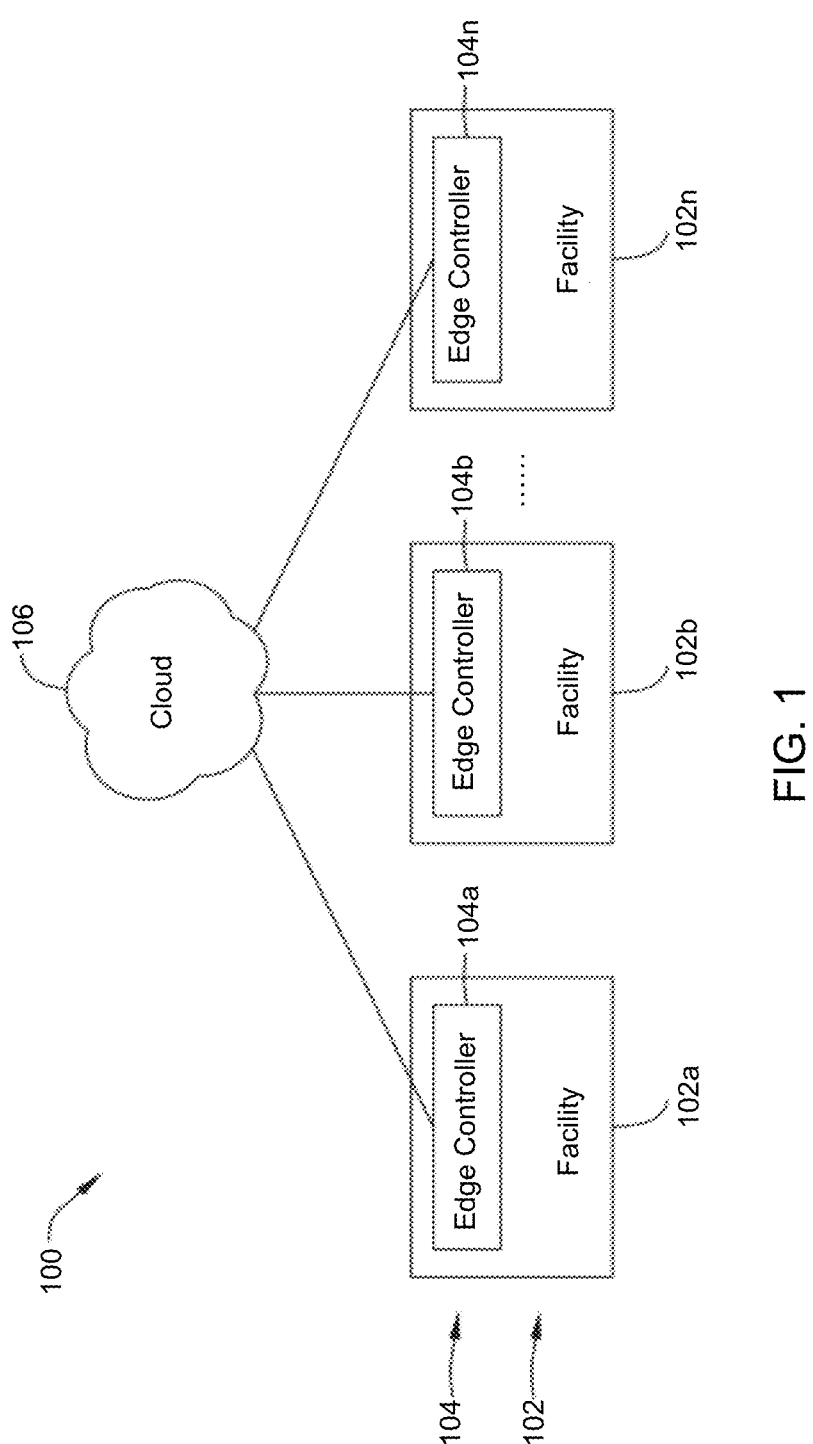
FIG. 1 illustrates a schematic diagram showing an exemplary asset management system to manage multiple assets in a facility in accordance with one or more example embodiments described herein.

The details of some embodiments of the subject matter described in this specification are set forth in the accompanying drawings and the description below. Other features, aspects, and advantages of the subject matter will become apparent from the description, the drawings, and the claims.

In accordance with one or more example embodiments, a method is described. In one or more example embodiments, the method comprises receiving first data associated with a first asset from amongst a plurality of assets in a facility, wherein the first data comprises first model data. Further, the method comprises comparing the first data with second data associated with a second asset from amongst the plurality of assets, wherein the second data comprises second model data. In this regard, the method further comprises determining a first similarity score based on the comparing of the first data and the second data. The method then comprises receiving first telemetry data associated with the first asset and second telemetry data associated with the second asset. Further, the method comprises identifying stationarity of the first telemetry data with the second telemetry data based on one or more first tests. In this regard, the method comprises determining a second similarity score based on the stationarity of the first telemetry data with the second telemetry data. The method also comprises determining a third similarity score based on an application of one or more machine learning models on the first telemetry data and the second telemetry data. In addition, the method comprises identifying a similarity between the first asset and the second asset based on the first similarity score, the second similarity score, and the third similarity score. Also, the method comprises providing one or more actions for the first asset based at least on the similarity between the first asset and the second asset.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DETAILED DESCRIPTION OF THE DRAWINGS

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one example embodiment of the present disclosure, and can be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some example embodiments, or it can be excluded.

One or more example embodiments of the present disclosure may provide an "Internet-of-Things" or "IoT" platform in a facility that uses real-time accurate models and visual analytics to manage diverse portfolio of assets in the facility. In this regard, the platform provides a mechanism to compare several assets and infer similarity associated with the assets. Per this aspect, the platform further provides one or more insights based on the inferred similarity. The IoT platform is an extensible platform that is portable for deployment in any cloud or data center environment for providing an enterprise-wide, top to bottom view, displaying status of processes, assets, people, and/or safety. Further, the IoT platform of the present disclosure supports end-to-end capability to execute digital twins against process data to provide measures based on asset similarity and manage diverse portfolio of assets in the facility.

Portfolio of assets in a facility often fall under diverse categories such as building management, surveillance, access control, financial management, energy management, and/or the like. For example, assets such as HVAC components, sensors, controllers, etc., fall under building management while CCTV cameras, displays, etc., fall under surveillance. Whereas, access control devices, servers, etc., fall under access control category. Scaling up workers with specialized domain knowledge to manually assess health and performance of these assets becomes an inefficient mechanism. Further, it is to be noted that number of assets associated with the facility is variable with time. This can be due to, for instance, temporarily added assets, temporarily deleted assets, replaced assets, damaged assets, under-service assets, yet to be installed assets, new assets to be added, newly onboarded assets, and/or the like in addition to other assets in the facility. Such variations in assets are often anticipated due to multiple requirements or factors in the facility. Provided that the assets are inter-connected directly or indirectly, an inter-relationship exists between the assets. At times, these variations affect normal processes and/or other assets. For example, a sensor malfunctioning in a boiler can affect performance of another boiler or a chiller in a building management system. In another example, a replaced asset can fail to operate up to the performance with which an original asset was operating thereby resulting in poor throughput. In another example, a new asset can fail during testing and validation processes while onboarding. In such situations, domain knowledge of workers fails to identify failures and underlying causes due to complex inter-relationship between the assets and sometimes complex nature of assets too. Accordingly, it becomes essential to send such assets back to, for instance, original equipment manufacturers (OEMs) to identify issues related to failures or operations as it becomes infeasible to service such assets at the facility. This is a challenging and time-consuming task resulting in unoptimized utilization of resources (such as personnel, finances, assets, time, and/or the like) and lowered productivity levels in the facility. Accordingly, management of portfolio of assets becomes time and cost intensive operation in the facility.

Thus, to address the above challenges, various examples of systems and methods described herein relates to management of a portfolio of assets in a facility based on a comparative analysis. Per this aspect, the systems and methods described herein performs the comparative analysis between assets to infer similarity and quality associated with the assets. The systems and methods described herein initially gathers data (such as asset models and telemetry data) for e.g., from original equipment manufacturers (OEMs) and/or in near-real time from the assets itself. Provided that the assets have certain level of overlap or similarity for instance, in view of manufacturer, a type of operation, a type of asset, etc., the comparative analysis described herein determines similarity levels between the assets. For instance, if two boilers are of same manufacturer or a part of same process, then similarity exists between the boilers. Further, the comparative analysis includes several analyses and/or tests that are performed on the gathered data to determine similarity levels. Firstly, a part of the comparative analysis includes parameter analysis that is performed using asset models associated with respective assets. The parameter analysis stage facilitates determination of a first similarity score indicative of how similar two assets are in view of configuration and parameters. Secondly, another part of the comparative analysis includes statistical tests that are performed on telemetry data to determine a second similarity score. This score indicates how similar two assets are based on stationarity between telemetry data of assets. Thirdly, yet another part of the comparative analysis includes application of machine learning model(s) on telemetry data to determine factors such as seasonality, cyclicity, and trend associated with telemetry data of assets. A third similarity score indicative of how similar two assets are based on the factors is then determined. Using the aforementioned similarity scores, a single similarity score is then computed and this score provides a similarity level between two assets. The similarity level and the score can then be used to derive insights associated with the assets. For instance, if the score is beyond a certain threshold, similarity or delta in similarity between the assets can be used to identify faulty components, derive set points responsible for underperformance, factors responsible for degradation of assets, corrective actions, and/or the like.

Accordingly, the comparative analysis described herein can unlock such numerous insights that facilitate for example, personnel in the facility to timely address issues associated with the assets. Further, the comparative analysis performed herein is applicable for wide range of assets irrespective of whether they are installed in the facility or yet to be onboarded. In this regard, the comparative analysis acts a qualification criteria for the assets. When the comparative analysis is performed for assets that are to be onboarded, faulty assets can be identified even without accepting them into the facility and also before shipping them to the facility. Whereas, when the comparative analysis is performed for assets that are already installed in the facility, underperforming or malfunctioning assets can be identified along with a root cause so that it can be addressed in a timely manner. Further, the comparative analysis can also provide predictions for example, regarding underperformance, malfunctioning, and/or failure of assets or its associated components. This facilitates predictive maintenance of assets thereby ensuring efficient management of portfolio of assets in the facility.

FIG. 1 illustrates a schematic diagram showing an exemplary asset management system to manage multiple assets in a facility in accordance with one or more example embodiments described herein. According to various example embodiments described herein, the exemplary asset management system 100 manages assets associated with each of one or more facilities 102a, 102b . . . 102n (collectively "facilities 102"). In this regard, a facility of the one or more facilities 102a, 102b . . . 102n can correspond to, for example, an industrial plant, a refinery, a factory, an industry, a corporate office, a cleanroom, a logistics environment, an airport premises, a transportation hub, a material handling environment, a warehouse, a distribution center, a sortation center, a supply chain environment, a pharmaceutical unit, a production plant, a manufacturing unit of original equipment manufacturer (OEM), and/or the like. In some example embodiments, the one or more facilities 102a, 102b . . . 102n in the illustrative system 100 can be of same type. For example, the facilities 102 can specifically correspond to cleanrooms. In some example embodiments, the one or more facilities 102a, 102b . . . 102n in the illustrative system 100 can be of different type. For example, one of the facilities 102 can specifically correspond to a cleanroom whereas another one of the facilities 102 can specifically correspond to a pharmaceutical unit. In some example embodiments, the facilities 102a, 102b . . . 102n in the illustrative system 100 can be spread across multiple geographical locations or sites. As it may be understood, in some example embodiments described herein, each of the facilities 102 often include one or more assets such as valves, pumps, compressors, pipelines, fans, turbines, machineries, controllers, displays, CCTVs, and/or the like based on a nature of the facility. At times, the one or more assets in the facility (for instance, in terms of number) are subjected to variations. This can be due to, for instance, temporarily added assets, temporarily deleted assets, replaced assets, damaged assets, under-service assets, yet to be installed assets, new assets to be added, newly onboarded assets, and/or the like in addition to other assets in the facility. These variations can be based on multiple requirements or factors in the facility. This impacts availability of some of these assets and normal operations in the facility. For example, a replaced asset can fail to operate up to the performance with which an original asset was operating in the facility. In another example, a new asset that is to be onboarded can fail to operate as per the expected performance say, during a testing stage. Further, given that the assets are inter-connected directly or indirectly, variations due to one asset affects other related assets and processes too. Accordingly, the illustrative system 100 described herein determines impacts due to such variations, derives insights based on comparison between assets, and addresses them in a timely manner to facilitate normal operations in the facility.

Further, in one or more example embodiments described herein, each of the one or more facilities 102a, 102b . . . 102n includes a respective edge controller 104a, 104b . . . 104n (collectively "edge controllers 104"). Per this aspect, the edge controller of the respective facility is configured to receive and/or collect data associated with the one or more assets in the facility. In this regard, the data includes asset models and telemetry data which comprises information such as current operating points or set points of the one or more assets, measurements associated with process variables, a type of material handled by the one or more assets, a process that is handled by the one or more assets, and/or the like. In addition, the telemetry data comprises test data values associated with the one or more assets as well. In accordance with some example embodiments, one or more sensors associated with the one or more assets sense the telemetry data. Further, in some example embodiments, the one or more sensors is communicatively coupled with the edge controller of the facility. In this regard, the one or more sensors transmit the telemetry data to the edge controller of the facility. Additionally, the edge controller is configured to pull the asset models from the one or more assets. Accordingly, the edge controller associated with the corresponding facility receives and/or collects the data associated with the one or more assets. Also, in some example embodiments, original equipment manufacturers (OEMs) of the one or more assets upload the data at the respective edge controller as well. In addition, in some example embodiments, the edge controller processes the data to derive the insights associated with each of the one or more assets. In this regard, the edge controller performs comparative analysis based at least on the data associated with the one or more assets to derive the insights. Per this aspect, the comparative analysis determines similarity levels between the assets in the corresponding facility. Also, in some example embodiments, the edge controller predicts trends and/or undertakes one or more measures based at least on the derived insights to manage portfolio of assets in the facility.

Further, in some example embodiments, the one or more facilities 102a, 102b . . . 102n can be operably coupled with a cloud 106, meaning that communication between the cloud 106 and the one or more facilities 102a, 102b . . . 102n is enabled. In some example embodiments, the one or more edge controllers 104a, 104b . . . 104n can be communicatively coupled to the cloud 106. The cloud 106 can represent distributed computing resources, software, platform or infrastructure services which can enable data handling, data processing, data management, and/or analytical operations on the data exchanged and transacted amongst the facilities 102. In accordance with some example embodiments, the data collected by the edge controllers 104 is uploaded to the cloud 106 for processing. Additionally, in some example embodiments, the OEMs of the one or more assets upload the data at the cloud 106 as well. Further, in accordance with some example embodiments, the cloud 106 processes the data to perform comparative analysis between the assets in the corresponding facility. In this regard, the cloud 106 derives the insights associated with the assets based on the comparative analysis. Also, in some example embodiments, the cloud 106 can generate one or more predictions based on the comparative analysis as well. Additionally, in some example embodiments, the cloud 106 can transmit the insights and/or predictions to a respective edge controller of the one or more edge controllers 104a, 104b . . . 104n in the facility. Also, in some example embodiments, the cloud 106 can transmit the insights and/or predictions to a mobile device associated with personnel in the facility.

In some example embodiments, the one or more edge controllers 104a, 104b . . . 104n can operate as intermediary node to transact the data between a respective facility and/or the cloud 106. In some example embodiments, each of the one or more edge controllers 104a, 104b . . . 104n is capable of processing and/or filtering the collected data so as to be compatible with the cloud 106. In some example embodiments, each of the one or more facilities 102a, 102b . . . 102n can comprise a respective gateway to transact data between a respective facility and/or the cloud 106. Accordingly, in some example embodiments, gateway can operate as intermediary node to transact data between a respective facility and/or the cloud 106. In some example embodiments, the cloud 106 includes one or more servers that can be programmed to communicate with the one or more facilities 102a, 102b . . . 102n and to exchange data as appropriate. The cloud 106 can be a single computer server or can include a plurality of computer servers. In some example embodiments, the cloud 106 can represent a hierarchal arrangement of two or more computer servers, where perhaps a lower level computer server (or servers) processes the telemetry data and the asset models, for example, while a higher-level computer server oversees operation of the lower level computer server or servers.

Figure 2:
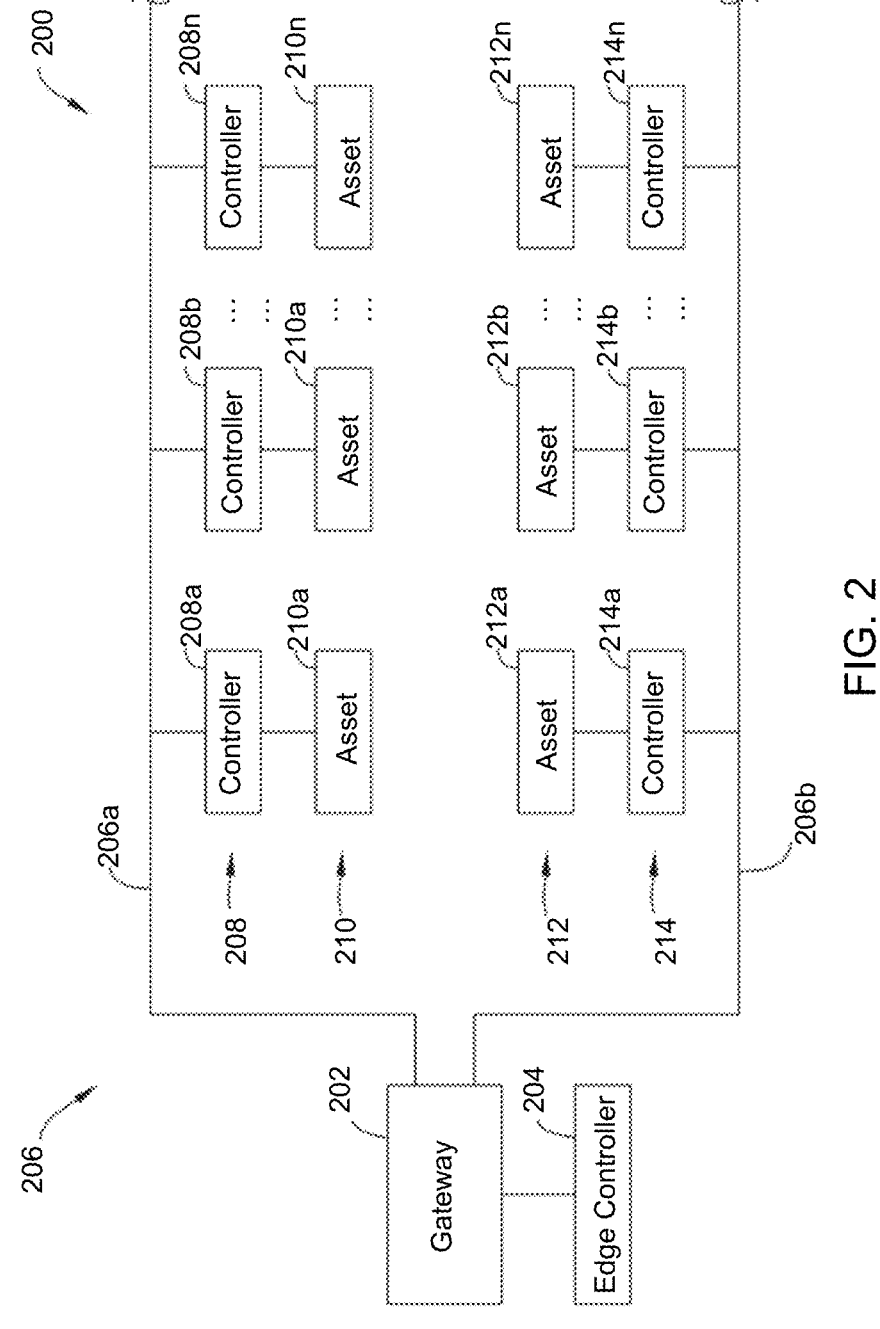
FIG. 2 illustrates a schematic diagram showing an exemplary arrangement of assets in a facility in accordance with one or more example embodiments described herein.

FIG. 2 illustrates a schematic diagram showing an exemplary arrangement of assets in a facility in accordance with one or more example embodiments described herein. In one or more example embodiments, an example facility 200 described herein corresponds to one of the facilities 102 described in accordance with FIG. 1 of the current disclosure. In various example embodiments, the example facility 200 of FIG. 2 comprises assets communicatively coupled via multiple networks 206 (e.g., communication channels). For instance, as illustrated in FIG. 2, the facility 200 includes a first network 206a and a second network 206b. In some example embodiments, the facility 200 can include only a single network 206. In some example embodiments, the facility 200 can include multiple networks 206. Each of the networks 206 can include any available network infrastructure. In some example embodiments, each of the networks 206 can independently be, for example, a BACnet network, a NIAGARA network, a NIAGARA CLOUD network, or others. Accordingly, in some example embodiments, the facility 200 comprises a plurality of assets and/or devices in communication with a gateway 202 via corresponding communication channel (e.g., networks 206a and/or 206b). Said differently, each of the network represents a sub-network supported by an underlined network communication/IoT protocol and incorporating a cluster of endpoints (e.g. assets, controllers etc. in building facility).

In some example embodiments, one or more first assets 210a, 210b, . . . 210n (collectively "first assets 210") are operably coupled to the first network 206a via one or more first controllers 208a, 208b, . . . 208n (collectively "first controllers 208"). The first assets 210 represent a variety of different types of assets that can be found within the facility 200. Accordingly, at least some of the first assets 210 can be, but not limited to valves, pumps, compressors, pipelines, fans, turbines, machineries, controllers, displays, CCTVs, and/or the like that fall under diverse categories of assets. Further, the first controllers 208 are operably coupled to one or more sensors associated with different types of assets within the facility 200. In some example embodiments, the one or more sensors can be integral part of the first assets 210. In this regard, the one or more sensors can correspond to cameras, temperature sensors, pressure sensors, heat sensors, flow rate sensors, position sensors, and/or the like. Per this aspect, the one or more sensors sense telemetry data such as current operating points or set points of the one or more first assets 210a, 210b, . . . 210n, measurements associated with process variables of processes handled by the one or more first assets 210a, 210b, . . . 210n, a type of material handled by the one or more first assets 210a, 210b, . . . 210n, and/or the like associated with the first assets 210. In addition, the telemetry data comprises test data values associated with the one or more first assets 210a, 210b, . . . 210n. Further, in some example embodiments, the one or more sensors transmit the telemetry data to the first controllers 208. For example, a flow rate sensor can be used to detect an operating set point of a valve. In this regard, the flow rate sensor transmits the operating set point to a corresponding first controller. In another example, a temperature sensor can be used to detect temperature values of a chiller. In this regard, the temperature sensor transmits the temperature values to a corresponding first controller. Also, in some example embodiments, the first controllers 208 are configured to pull asset models associated with the one or more first assets 210a, 210b, . . . 210n as well.

In some example embodiments, the first controllers 208 control operation of at least one of the first assets 210. In this regard, the one or more first controllers 208a, 208b, . . . 208n process and/or analyze the telemetry data and the asset models to derive one or more insights for at least some of the first assets 210 in the facility 200. The one or more insights can be related to operating points, performance, configuration, etc., associated with at least some of the first assets 210. Based at least on the derived insights, the one or more first controllers 208a, 208b, . . . 208n predict trends and/or undertake one or more measures to control at least some of the first assets 210 in the facility 200. For example, a trend can correspond to operating performance of an asset for next 30 days. Whereas in another example, a measure can correspond to modifying set point of an asset to make it operate up to a performance of the best performing asset. In some example embodiments, the one or more insights can be associated with processes handled by the first assets 210 too. In accordance with some example embodiments, the one or more first controllers 208a, 208b, . . . 208n can be built into one or more of the corresponding one or more first assets 210a, 210b, . . . 210n, and need not be a separate component. Whereas, in accordance with some other example embodiments, the one or more first controllers 208a, 208b, . . . 208n can be virtual controllers that can be implemented within a virtual environment hosted by one or more computing devices (not illustrated). Also, in some example embodiments, the one or more first controllers 208a, 208b, . . . 208n can be containerized. In some other example embodiments, at least some of the one or more first assets 210a, 210b, . . . 210n can be controllers. In such case, the one or more first assets 210a, 210b, . . . 210n need not have a separate corresponding controller of the one or more first controllers 208a, 208b, . . . 208n.

In some example embodiments, one or more second assets 212a, 212b, . . . 212n (collectively "second assets 212") are operably coupled to the second network 206b via one or more second controllers 214a, 214b, . . . 214n (collectively "second controllers 214"). The second assets 212 represent a variety of different types of assets that can be found within the facility 200. Accordingly, at least some of the second assets 212 can be, but not limited to valves, pumps, compressors, pipelines, fans, turbines, machineries, controllers, displays, CCTVs, and/or the like that fall under diverse categories of assets. Further, the second controllers 214 are operably coupled to one or more sensors associated with different types of assets within the facility 200. In some example embodiments, the one or more sensors can be integral part of the second assets 212. In this regard, the one or more sensors can correspond to cameras, temperature sensors, pressure sensors, heat sensors, flow rate sensors, position sensors, and/or the like. Per this aspect, the one or more sensors sense telemetry data such as current operating points or set points of the one or more second assets 212a, 212b, . . . 212n, measurements associated with process variables of processes handled by the one or more second assets 212a, 212b, . . . 212n, a type of material handled by the one or more second assets 212a, 212b, . . . 212n, and/or the like associated with the second assets 212. In addition, the telemetry data comprises test data values associated with the one or more second assets 212a, 212b, . . . 212n. Further, in some example embodiments, the one or more sensors transmit the telemetry data to the second controllers 214. For example, a flow rate sensor can be used to detect an operating set point of a valve. In this regard, the flow rate sensor transmits the operating set point to a corresponding second controller. In another example, a temperature sensor can be used to detect temperature values of a chiller. In this regard, the temperature sensor transmits the temperature values to a corresponding second controller. Also, in some example embodiments, the second controllers 214 are configured to pull asset models associated with the one or more second assets 212a, 212b, . . . 212n as well.

In some example embodiments, the second controllers 214 control operation of at least one of the second assets 212. In this regard, the one or more second controllers 214a, 214b, . . . 214n process and/or analyze the telemetry data and the asset models to derive one or more insights for at least some of the second assets 212 in the facility 200. The one or more insights can be related to operating points, performance, configuration, etc., associated with at least some of the second assets 212. Based at least on the derived insights, the one or more second controllers 214a, 214b, . . . 214n predict trends and/or undertake one or more measures to control at least some of the second assets 212 in the facility 200. For example, a trend can correspond to operating performance of an asset for next 30 days. Whereas in another example, a measure can correspond to modifying set point of an asset to make it operate up to a performance of the best performing asset. In some example embodiments, the one or more insights can be associated with processes handled by the second assets 212 too. In accordance with some example embodiments, the one or more second controllers 214a, 214b, . . . 214n can be built into one or more of the corresponding one or more second assets 212a, 212b, . . . 212n, and need not be a separate component. Whereas, in accordance with some other example embodiments, the one or more second controllers 214a, 214b, . . . 214n can be virtual controllers that can be implemented within a virtual environment hosted by one or more computing devices (not illustrated). Also, in some example embodiments, the one or more second controllers 214a, 214b, . . . 214n can be containerized. In some other example embodiments, at least some of the one or more second assets 212a, 212b, . . . 212n can be controllers. In such case, the one or more second assets 212a, 212b, . . . 212n need not have a separate corresponding controller of the one or more second controllers 214a, 214b, . . . 214n. In some example embodiments, the first assets 210 and the second assets 212 can be part of same processes in the facility 200. Whereas in some example embodiments, the first assets 210 and the second assets 212 can be part of distinct processes in the facility 200. Irrespective of whether the first assets 210 and the second assets 212 are part of same process or not, the first assets 210 and the second assets 212 can be related to each other. Also, in some example embodiments, the first assets 210 and the second assets 212 can be located at a same portion of the facility 200. Whereas in some example embodiments, the first assets 210 and the second assets 212 can be located at different portions of the facility 200. Irrespective of whether the first assets 210 and the second assets 212 are part of same portions or not, the first assets 210 and the second assets 212 can be related to each other.

Further, in some example embodiments, the facility 200 includes a gateway 202 that is operably coupled with the first network 206a and the second network 206b. In one example embodiment, the gateway 202 can be operably coupled with the first network 206a but not with the second network 206b. In another example embodiment, the gateway 202 can be operably coupled with the second network 206b but not with the first network 206a. Accordingly, in some example embodiments, the gateway 202 is a legacy controller. In some example embodiments, the gateway 202 can be absent. In accordance with some example embodiments, an edge controller 204 is installed within the facility 200. In some example embodiments, the edge controller 204 can be operably coupled with the gateway 202. In this regard, the edge controller 204 serves as an intermediary node between the first controllers 208, the second controllers 214, and the cloud 106 (as described in accordance with FIG. 1 of the current disclosure). For instance, in an example, the edge controller 204 can pull data (the telemetry data and the asset models) from the first controllers 208 and the second controllers 214 and provide the data to the cloud 106. In some example embodiments, the edge controller 204 is configured to discover the first assets 210, the second assets 212, the first controllers 208, and/or the second controllers 214 that are connected along a local network such as the network 206. In some example embodiments, the network protocol of the network 206 includes discovery commands that, for example, are used to request that all assets connected to the network 206 identify themselves. Whereas, in another example, the edge controller 204 is configured to discover the first assets 210 and the second assets 212 regardless of an underlaying protocol supported by the first assets 210 and the second assets 212. In other words, the edge controller 204 can discover the first assets 210 and the second assets 212 supported by different protocols (e.g., BACnet, Modbus, LonWorks, SNMP, MQTT, Foxs, OPC UA etc.). Also, in some example embodiments, the edge controller 204 is configured to receive the telemetry data and the asset models from original equipment manufacturers (OEMs) of the first assets 210 and/or the second assets 212 as well.

More generally, and in some example embodiments, the edge controller 204 is communicatively coupled to the first assets 210 and the second assets 212, via one or more networks. Further, in some example embodiments, the edge controller 204 interrogates any assets it finds operably coupled to the network 206 to obtain additional information from those assets that further helps the edge controller 204 and/or the cloud 106 identify the connected assets (such as, but not limited to actuators, valves, compressors, pumps, etc.), functionality of the assets, connectivity of the local controllers and/or the assets, types of operational data that is available from the local controllers and/or the assets, types of alarms that are available from the local controllers and/or the assets, and/or any other suitable information. For purpose of brevity, the additional information requested from the assets is referred interchangeably as, 'metadata' or 'semantic data', hereinafter throughout the description. Additionally, in some example embodiments, the edge controller 204 interrogates new incoming assets that are just onboarded to the facility as well. In this regard, the edge controller 204 obtains information such as telemetry data and asset models associated with the new incoming assets. Based at least on the obtained information, the edge controller 204 can perform, for instance, comparative analysis between the new incoming assets and best performing assets already installed in the facility 200. For purpose of brevity, the term 'assets' is also referred interchangeably to as 'data points', 'end points', 'devices', 'sensors', or 'electronic devices' throughout the description. Also, in some example embodiments described herein, the term 'asset' can refer to a specific component, a specific part, and/or a specific sensor associated with an asset.

According to some example embodiments, the edge controller 204 is configured to receive the data (telemetry data and model data) associated with each of the first assets 210 and/or the second assets 212 from the first controllers 208 and/or the second controllers 214. Whereas in some example embodiments, the edge controller 204 receives the data directly from the first assets 210 and/or the second assets 212 as well. In some example embodiments, the first assets 210 and/or the second assets 212 can correspond to various independent and diverse sub-systems in the facility 200. For example, the first assets 210 (or the second assets 212) can correspond to components, parts, or sensors associated with a single asset forming a sub-system in the facility 200. In another example, the first assets 210 can correspond to new incoming assets in the facility 200 whereas the second assets 212 can correspond to best performing assets in the facility 200. The telemetry data received from the assets (i.e., the first assets 210 and/or the second assets 212) can represent time-series data. In this regard, the telemetry data comprises a plurality of data values associated with the assets which can be collected over a period of time. The data values can represent, for example, a plurality of sensor readings collected by a sensor over a period of time, current operating points or set points of the assets, measurements associated with process variables of processes handled by the assets, and/or the like. Further, the model data represents asset models along with metadata associated with the assets. The metadata can correspond to configuration data and parameter data associated with the assets. In this regard, the configuration data comprises hierarchical information, spatial relationship, geographical information (e.g., location of an asset), configuration information, datasheet information associated with the assets, etc. Whereas the parameter data comprises names associated with asset parameters (a data type or a data format associated with data transacted through an asset), a type of set point (e.g., sensor setting based on which a sensor is commissioned), a role of the set point, relationship between the asset parameters (e.g., a relationship of one asset with one or more other assets), statistics associated with the set point and the asset parameters, etc. The model data can also be indicative of ancillary or contextual information associated with the assets. In accordance with various example embodiments described herein, the term 'model data' can be referred interchangeably as 'semantic model', 'asset model', or 'metadata' for purpose of brevity. Additionally, in some example embodiments, the facility 200 is flexible with respect to number of first assets 210 and/or second assets 212. Said alternatively, the facility 200 can include temporarily added assets, temporarily deleted assets, replaced assets, damaged assets, under-service assets, yet to be installed assets, new assets to be added, newly onboarded assets, and/or the like in addition to other assets in the facility.

In accordance with some example embodiments, the edge controller 204 is configured to discover and identify the assets which are communicatively coupled to the edge controller 204. Further, upon identification of the assets, the example edge controller 204 is configured to pull the telemetry data and the model data from the various identified assets. The edge controller 204 is configured to pull the data by sending one or more data interrogation requests to the assets. These data interrogation requests can be based on a protocol supported by the underlying assets. In accordance with some example embodiments, the edge controller 204 is configured to receive the telemetry data and the model data in various data formats or different data structures. In an example, a format of the telemetry data and the model data, received at the edge controller 204 can be in accordance with a communication protocol of the network supporting transaction of data amongst two or more network nodes (i.e., the edge controller 204 and the asset). As can be appreciated, in some example embodiments, the various assets in the facility 200 can be supported by one or more of various network protocols (e.g., IoT protocols like BACnet, Modbus, LonWorks, SNMP, MQTT, Foxs, OPC UA etc.). Accordingly, and in some cases, the edge controller 204 is configured to pull the telemetry data and the model data, in accordance with communication protocol supported by the assets.

In some example embodiments, the edge controller 204 is configured to process the received data and transform the data into a unified data format. The unified data format is referred hereinafter as a common object model. In an example, the common object model is in accordance with an object model that can be required by one or more data analytics applications or services, supported at the cloud 106. In some example embodiments, the edge controller 204 can perform data normalization to normalize the received data into a pre-defined data format. In an example, the pre-defined format can represent a common object model in which the edge controller 204 can further push the telemetry data and the model data to the cloud 106. In some example embodiments, the edge controller 204 is configured to establish a secure communication channel with the cloud 106. In this regard, the data can be transacted between the edge controller 204 and the cloud 106, via the secure communication channel. In some example embodiments, the edge controller 204 can send the data to the cloud 106 automatically at pre-defined time intervals. In some example embodiments, at least a part of the data can correspond to historic data. In some example embodiments, the edge controller 204 and/or the cloud 106 can perform the comparative analysis between the assets based on the data and/or the common object model. Accordingly, the edge controller 204 and/or the cloud 106 can derive the one or more insights associated with the assets in the facility 200 based on the comparative analysis.

Figure 3:
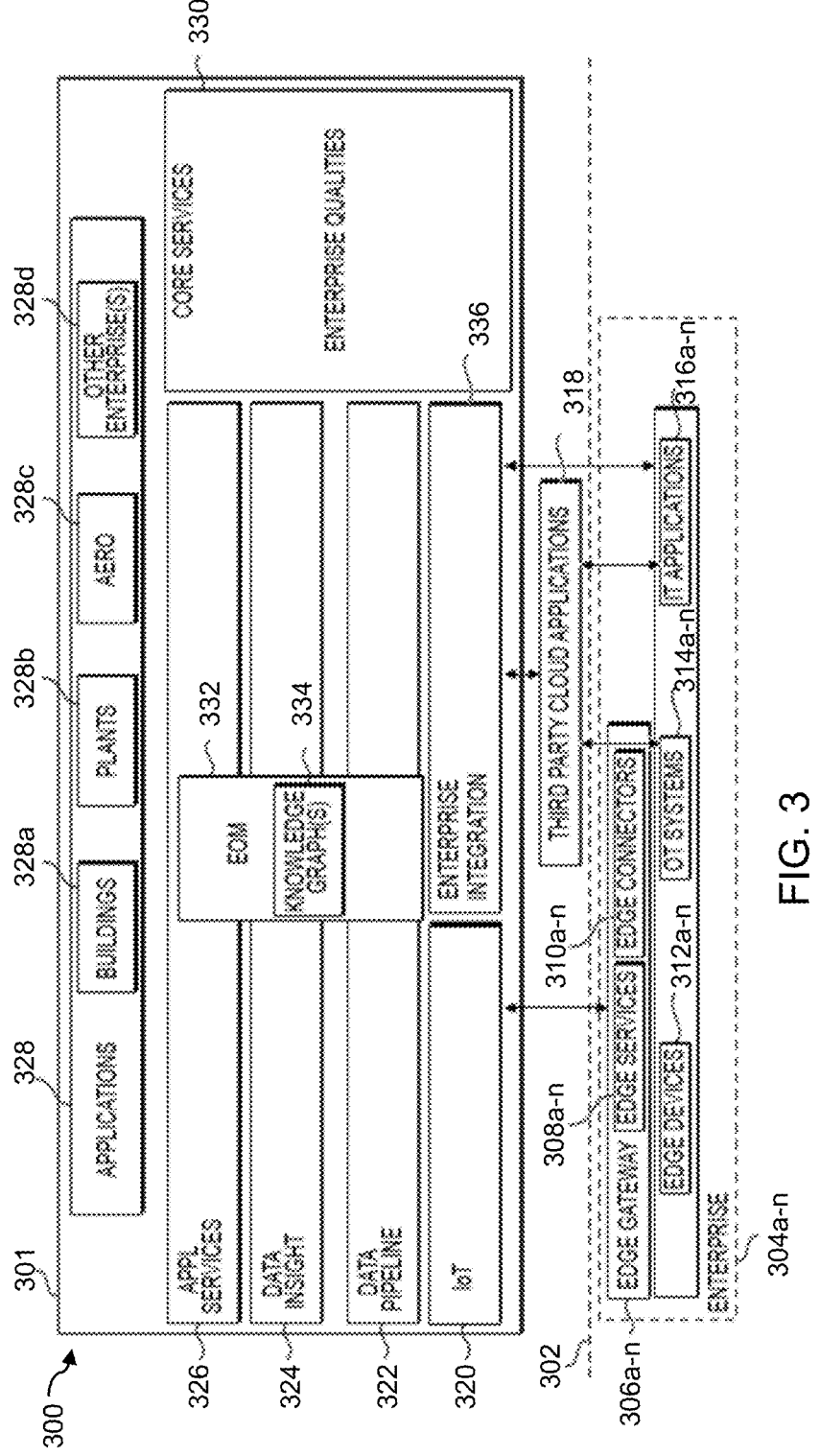
FIG. 3 illustrates a schematic diagram showing a framework of an Internet-of-Things (IoT) platform utilized in an asset management system in accordance with one or more example embodiments described herein.

FIG. 3 illustrates a schematic diagram showing a framework of an Internet-of-Things (IoT) platform utilized in an asset management system in accordance with one or more example embodiments described herein. The IoT platform 301 of the present disclosure is a platform used by asset management system that uses real-time accurate models and/or visual analytics to manage portfolio of assets in a facility to ensure sustained peak performance of the facility or enterprise 304a-304n. The IoT platform 301 is an extensible platform that is portable for deployment in any cloud or data center environment for providing an enterprise-wide, top to bottom view, displaying the status of processes, assets, people, and safety. Further, the IoT platform 301 supports end-to-end capability to execute digital twins against process data and to manage portfolio of assets in the enterprise, using the framework 300, detailed further below.

As shown in FIG. 3, the framework 300 of the IoT platform 301 comprises a number of layers including, for example, an IoT layer 320, an enterprise integration layer 336, a data pipeline layer 322, a data insight layer 324, an application services layer 326, and an applications layer 328. The IoT platform 301 also includes a core services layer 330 and an extensible object model (EOM) 332 comprising one or more knowledge graphs 334. The layers 320-330 further include various software components that together form each layer 320-330. For example, in one or more embodiments, each layer 320-330 includes one or more of the modules, models, engines, databases, services, applications, or combinations thereof. In some embodiments, the layers 320-330 are combined to form fewer layers. In some embodiments, some of the layers 320-330 are separated into separate, more numerous layers. In some embodiments, some of the layers 320-330 are removed while others can be added.

The IoT platform 301 is a model-driven architecture. Also, in some example embodiments, the IoT platform 301 receives data (such as telemetry data and/or model data) associated with one or more assets (e.g., edge devices 312a-312n). In this regard, the IoT platform 301 receives and/or collects the data associated with the edge devices 312a-312n. In some example embodiments, the IoT platform 301 receives the data from the edge devices 312a-312n and/or original equipment manufacturers (OEMs) of the edge devices 312a-312n. In accordance with certain embodiments, the extensible object model (EOM) 332 communicates with each layer 320-330 to contextualize the data of the enterprise 304a-304n using an extensible object model and knowledge graphs 334 where the one or more assets (e.g., edge devices 312a-312n) and processes of the facility or the enterprise 304a-304n are modeled. In some example embodiments, the edge devices 312a-312n can be one of the one or more assets as illustrated in FIGS. 1 and 2 of the current disclosure. The knowledge graphs 334 of EOM 332 are configured to store the models in a central location. The knowledge graphs 334 define a collection of nodes and links that describe real-world connections that enable smart systems. As used herein, a knowledge graph 334: (i) describes real-world entities (e.g., edge devices 312a-312n) and their interrelations organized in a graphical interface; (ii) defines possible classes and relations of entities in a schema; (iii) enables interrelating arbitrary entities with each other; and (iv) covers various topical domains. In other words, the knowledge graphs 334 define large networks of entities (e.g., edge devices 312a-312n), semantic types of the entities, properties of the entities, and relationships between the entities. Thus, the knowledge graphs 334 describe a network of "things" that are relevant to a specific domain, an enterprise, or a facility. The knowledge graphs 334 are not limited to abstract concepts and relations, but can also contain instances of objects, such as, for example, documents and datasets. Additionally, the knowledge graphs 334 comprise inter-relationships between the assets as well. In some example embodiments, the knowledge graphs 334 include resource description framework (RDF) graphs. As used herein, a "RDF graph" is a graph data model that formally describes the semantics, or meaning, of information. The RDF graph also represents metadata (e.g., data that describes data or data associated with asset models). In some example embodiments, the knowledge graphs 334 comprises data related to operating boundaries, safety limits, performance, configuration, datasheets, parameters, processes and/or the like associated with each of the one or more assets in the facility 304a-304n. In this regard, the IoT platform 301 performs comparative analysis between the assets based on the knowledge graphs 334 to derive one or more insights. For instance, the IoT platform 301 determines similarity levels between the assets based on the comparative analysis. Further, in accordance with some example embodiments, the knowledge graphs 334 is updated to include the one or more insights as well. The one or more insights of the knowledge graphs 334 can be related to operating points, performance, configuration, etc., of the assets and/or processes handled by the assets in the facility. Further, the knowledge graphs 334 can be used to create one or more service cases based at least on the one or more insights. According to various example embodiments, the knowledge graphs 334 also include a semantic object model. The semantic object model is a subset of a knowledge graph 334 that defines semantics for the knowledge graph 334. For example, the semantic object model defines the schema for the knowledge graph 334.

As used herein, EOM 332 is a collection of application programming interfaces (APIs) that enables seeded semantic object models to be extended. For example, the EOM 332 of the present disclosure enables a customer's knowledge graph 334 to be built subject to constraints expressed in the customer's semantic object model. Thus, the knowledge graphs 334 are generated by customers (e.g., enterprises or organizations) to create models of the edge devices 312a-312n using their corresponding data in the enterprise 304a-304n, and the knowledge graphs 334 are input into the EOM 332 for visualizing the models (e.g., nodes and links). In some example embodiments, knowledge graphs 334 are input into the EOM 332 for visualizing performance of the assets, inter-relationship between the assets, similarity levels between the assets, insights derived from the comparative analysis, and/or the like. The models describe the one or more assets (e.g., the nodes) of the enterprise (e.g., the edge devices 312a-312n) and describe the relationship between the one or more assets (e.g., the links). The models also describe the schema (e.g., describe what the data is), and therefore the models are self-validating. For example, the model describes the type of sensors mounted on any given asset (e.g., edge device 312a-312n) and the type of data that is being sensed by each sensor. In another example, the model describes configuration data and parameter data corresponding to assets models associated with the assets (e.g., edge device 312a-312n). Yet in another example, the model describes insights derived from the comparative analysis as well.

According to various embodiments, the IoT platform 301 is an extensible, model-driven end-to-end stack including: two-way model sync and secure data exchange between the edge and the cloud, metadata driven data processing (e.g., rules, calculations, and aggregations), and model driven visualizations and applications. As used herein, "extensible" refers to the ability to extend a data model to include new asset models, new performance standards, new rules, new properties, new columns, new fields, new classes, new tables, new operating boundaries for the one or more assets, new insights, and/or new relations. Thus, the IoT platform 301 is extensible with regards to the edge devices 312a-312n and the applications that handle those devices 312a-312n. For example, when new edge devices (or new devices) are to be onboarded to the enterprise 304a-304n, the IoT platform 301 performs the comparative analysis say, with respect to best performing assets in the enterprise 304a-304n. In this regard, the IoT platform 301 verifies configuration, operational parameters, expected performance, and/or the like of the new edge devices. Further, the new edge devices will automatically appear in the IoT platform 301 when onboarded to the facility 304a-304n. In addition, the IoT platform 301 receives telemetry data and asset models from the new devices along with the existing edge devices 312a-312n. Accordingly, the IoT platform 301 has the capability to generate and/or update models associated with the new devices in near-real time based at least on the telemetry data and the asset models. Further, the IoT platform 301 also performs the comparative analysis say, with respect to best performing assets in the enterprise 304a-304n upon onboarding the new devices as well. For example, when new edge devices are operational in the enterprise 304a-304n, the IoT platform 301 performs the comparative analysis say, with respect to best performing assets in the enterprise 304a-304n. In this regard, the IoT platform 301 checks if the configuration, operational parameters, expected performance, and/or the like of the new edge devices is as per the expectations with respect to best performing assets in the enterprise 304a-304n. With this, the corresponding applications 328 can understand and use the data from the new devices to manage the new devices and/or processes in the facility or the enterprise 304a-304n.

In some cases, asset templates are used to facilitate configuration of instances of edge devices 312a-312n in the model using common structures. An asset template defines the typical properties or parameters for the edge devices 312a-312n of a given facility or enterprise 304a-304n for a certain type of device or asset. Some of the typical properties are static in nature. For example, an asset template of a pump includes model of the pump that comprises number of inlet and outlet pressures, operational speed, flow rate, hardware and software configurations, geographical location of the pump, hierarchical level of the pump in the facility, different components of the pump, etc. In other words, properties such as pressure, speed, flow rate, hardware configuration, etc., for which the pump is configured to measure or sense is static. However, values or measurements associated with the pump in real-time for the corresponding properties, software configurations, etc., are dynamic in nature. In this regard, the asset template of the pump can be dynamically updated in a timely manner. Additionally, the asset templates can include models of a specific component, part, or sensor associated with the asset as well. Also, it is to be noted that the templates can also include hierarchical or derived types of edge devices 312a-312n to accommodate variations of a base type of device 312a-312n. For example, a reciprocating pump is a specialization of a base pump type and would include additional properties in the template. Instances of the edge device 312a-312n in the model are configured to match the actual, physical devices of the enterprise 304a-304n using the templates to define expected attributes of the device 312a-312n. Each attribute is configured either as a static value (e.g., capacity is 1000 BPH, number of inlet valve is two, etc.) or with a reference to a time series tag that provides the value. The knowledge graph 334 can automatically map the tag to the attribute based on naming conventions, parsing, and matching the tag and attribute descriptions and/or by comparing the behavior of the time series data with expected behavior.

In some example embodiments, modeling phase includes an onboarding process for syncing the models between the edge and the cloud. In some example embodiments, the modeling phase can also include construction of the knowledge graph 334 using the telemetry data and the model data received from the one or more assets in the enterprise 304a-304n. For example, the onboarding process includes a simple onboarding process, a complex onboarding process, and/or a standardized rollout process. The simple onboarding process includes the knowledge graph 334 receiving raw model data from the edge and running context discovery algorithms to generate the model. The context discovery algorithms read the context of the edge naming conventions of the edge devices 312a-312n and determine what the naming conventions refer to. For example, in one or more example embodiments, the knowledge graph 334 receives "TMP" during the modeling phase and determines that "TMP" relates to "temperature". The generated models are then published. In some example embodiments, the complex onboarding process includes the knowledge graph 334 receiving the raw model data, receiving point history data, and receiving site survey data. According to various example embodiments, the knowledge graph 334 then uses these inputs to run the context discovery algorithms. According to various example embodiments, the generated models are edited and then the models are published. The standardized rollout process includes manually defining standard models in the cloud and pushing the models to the edge.

The IoT layer 320 includes one or more components for device management, data ingest, and/or command/control of the edge devices 312a-312n. The components of the IoT layer 320 enable data to be ingested into, or otherwise received at, the IoT platform 301 from a variety of sources. For example, data is ingested from the edge devices 312a-312n through process historians or laboratory information management systems. In another example, data is ingested from the OEMs of the edge devices 312a-312n. The IoT layer 320 is in communication with the edge connectors 310a-310n installed on the edge gateways 306a-306n through network 302, and the edge connectors 310a-310n send the data securely to the IoT platform 301. In some example embodiments, the edge connectors 310a-310n can correspond to edge controller 204 described in accordance with FIG. 2 of the current disclosure. In some example embodiments, only authorized data is sent to the IoT platform 301, and the IoT platform 301 only accepts data from authorized edge gateways 306a-306n, authorized OEMs, and/or edge devices 312a-312n. According to various example embodiments, data is sent from the edge gateways 306a-306n to the IoT platform 301 via direct streaming and/or via batch delivery. In some example embodiments, the edge gateways 306a-306n can correspond to gateway 202 described in accordance with FIG. 2 of the current disclosure. Further, after any network or system outage, data transfer will resume once communication is re-established and any data missed during the outage will be backfilled from the source system or from a cache of the IoT platform 301. According to various example embodiments, the IoT layer 320 also includes components for accessing time series, alarms and events, and transactional data via a variety of protocols.

The enterprise integration layer 336 includes one or more components for events/messaging, file upload, and/or REST/OData. The components of the enterprise integration layer 336 enable the IoT platform 301 to communicate with third party cloud applications 318, such as any application(s) operated by an enterprise or OEMs in relation to its edge devices. For example, the enterprise integration layer 336 connects with enterprise databases, such as guest databases, customer databases, financial databases, patient databases, etc. The enterprise integration layer 336 provides a standard application programming interface (API) to third parties for accessing the IoT platform 301. For example, the enterprise integration layer 336 allows OEMs to upload the data associated with the edge devices 312a-312n so that the IoT platform 301 can perform the comparative analysis for the edge devices 312a-312n. Additionally, the enterprise integration layer 336 allows OEMs to upload the data associated with some new edge devices even before shipping them to the facility 304a-304n to facilitate the comparative analysis for new edge devices. The enterprise integration layer 336 also enables the IoT platform 301 to communicate with the OT systems 314a-314n and IT applications 316a-316n of the enterprise 304a-304n. Thus, the enterprise integration layer 336 enables the IoT platform 301 to receive data from the third-party applications 318 rather than, or in combination with, receiving the data from the edge devices 312a-312n directly. In accordance with some example embodiments, the enterprise integration layer 336 also enables the IoT platform 301 to receive feedback from personnel in the enterprise 304a-304n related to operations and/or performance associated with the one or more assets.

The data pipeline layer 322 includes one or more components for data cleansing/enriching/normalization, data transformation, data calculations/aggregations, and/or API for data streams. Accordingly, in one or more example embodiments, the data pipeline layer 322 pre-processes and/or performs initial analytics on the received data. The data pipeline layer 322 executes advanced data cleansing routines including, for example, data correction, mass balance reconciliation, data conditioning, component balancing and simulation to ensure the desired information is used as a basis for further processing. In some example embodiments, the data pipeline layer 322 can process the feedback from personnel to identify new insights, new service cases, new tags, new properties, new columns, new fields, new classes, new tables, and new relations, new performance standards, etc., associated with the one or more assets. The data pipeline layer 322 also provides advanced and fast computation capabilities. For example, in one or more example embodiments, cleansed data is run through enterprise-specific digital twins. According to various example embodiments, the enterprise-specific digital twins include a reliability advisor containing process models to determine current operating performances and the fault models to trigger any early detection of faults or underperformance situations in order to determine an appropriate resolution. According to various example embodiments, the digital twins also include an optimization advisor that integrates real-time economic data with real-time process data, determines optimal performance standards, identifies optimal set points, and/or the like to effectively manage assets in the enterprise 304a-304n.

In some example embodiments, the data pipeline layer 322 employs models and templates to define calculations and analytics. Accordingly, the data pipeline layer 322 employs models and templates to define how the calculations and analytics relate to the one or more assets (e.g., the edge devices 312a-312n). In this regard, the IoT platform 301 employs the calculations and analytics to perform the comparative analysis between the assets. The calculations and analytics can correspond to several analyses and/or tests that is performed by the IoT platform 301. For example, the analyses and tests can correspond to parameter analysis, statistical tests, and application of machine learning models on data such as the telemetry data and the model data associated with the assets. The data pipeline layer 322 of the IoT platform 301 performs these analyses and tests to compute several similarity scores. Based at least on the similarity scores, the data pipeline layer 322 determines similarity levels between the assets. In some example embodiments, the data pipeline layer 322 automatically executes at least some of the analyses and tests to perform the comparative analysis between the assets. For example, a fan template defines fan efficiency calculations such that every time a fan is configured, the standard efficiency calculation is automatically executed for the fan. In another example, a parameter analysis along with some statistical tests for a new asset can be automatically executed when onboarded into the facility. The calculation model defines the various types of calculations, the type of engine that should run the calculations, the input and output parameters, the preprocessing requirement and prerequisites, the schedule, expected performance of assets, etc. According to various example embodiments, the actual calculation or analytic logic is defined in the template or it may be referenced. Thus, according to various example embodiments, the calculation model is employed to describe and control the execution of a variety of different process models and thereby operation of the one or more assets. According to various example embodiments, calculation templates are linked with the asset templates such that when an asset (e.g., edge device 312a-312n) instance is created, any associated calculation instances are also created with their input and output parameters, operating limits, expected performances, and/or the like linked to the appropriate attributes of the asset (e.g., edge device 312a-312n). According to various example embodiments, the data pipeline layer 322 can identify the one or more insights based on the calculations and analytics. According to various example embodiments, the IoT platform 301 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 304a-304n performance to identify issues or opportunities, and the potential causes or drivers of the issues or opportunities. The IoT platform 301 includes rich hierarchical symptom-fault models to identify abnormal conditions and their potential consequences. For example, the IoT platform 301 can identify underperforming assets based on comparative analysis with the best performing assets in the enterprise 304a-304n. Further, in another example, the IoT platform 301 can determine and/or predict a potential consequence due to underperforming assets. Also, in another example, the IoT platform 301 can determine that an operating set point of an asset is responsible for underperformance of the asset. In this regard, in one or more embodiments, the IoT platform 301 drill downs from a high-level condition to understand the contributing factors, as well as determining the potential impact a lower level condition may have. There can be multiple fault models for a given enterprise 304a-304n looking at different aspects such as process, equipment, control, and/or operations. According to various example embodiments, each fault model identifies issues and opportunities in their domain, and can also look at the same core problem from a different perspective. According to various example embodiments, an overall fault model is layered on top to synthesize the different perspectives from each fault model into an overall assessment of the situation and point to the true root cause.

According to various example embodiments, when a fault or opportunity is identified, the IoT platform 301 provides one or more actions and/or recommendations to be taken in the facility. Initially, the actions and/or recommendations can be based on expert knowledge that has been pre-programmed into the system by process and equipment experts. A recommendation services module presents this information in a consistent way regardless of source, and supports workflows to track, close out, and document the recommendation follow-up. According to various example embodiments, the recommendation follow-up is employed to improve the overall knowledge of the system over time as existing recommendations are validated (or not) or new cause and effect relationships are learned by users (for example, personnel in the facility) and/or analytics.

According to various example embodiments, the models are used to accurately predict what will occur before it occurs and interpret the status of the installed base. Thus, the IoT platform 301 enables operators to quickly initiate maintenance measures when irregularities (such as faulty components, overall asset faults, underperforming new assets, and/or the like) occur. In some example embodiments, the one or more recommendations can be created to address the irregularities in the enterprise 304a-304n. According to various example embodiments, the digital twin architecture of the IoT platform 301 employs a variety of modeling techniques. According to various example embodiments, the modeling techniques include, for example, rigorous models, fault detection and diagnostics (FDD), descriptive models, predictive maintenance, prescriptive maintenance, process optimization, and/or any other modeling technique.

According to various example embodiments, the rigorous models are converted from process design simulation. In this manner, in certain example embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various example embodiments, the descriptive models identifies a problem and the predictive models determines possible damage levels and maintenance options (say, to manage portfolio of assets). According to various example embodiments, the descriptive models include models for defining the optimal operating set points and performances for the edge devices 312a-312n.

Predictive maintenance includes predictive analytics models developed based on rigorous models and statistic models, such as, for example, principal component analysis (PCA) and partial least square (PLS). According to various example embodiments, machine learning methods are applied to train models for fault prediction. According to various example embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various example embodiments, prescriptive analysis selects the right solution based on the company's capital, operational, and/or other requirements. Process optimization is determining optimal conditions via adjusting set points and schedules. The optimized set points and schedules can be communicated directly to the underlying controllers, which enables automated closing of the loop from analytics to control.

The data insight layer 324 includes one or more components for time series databases (TDSB), relational/document databases, data lakes, blob, files, images, and videos, and/or an API for data query. According to various example embodiments, when raw data is received at the IoT platform 301, the raw data is stored as time series tags or events in warm storage (e.g., in a TSDB) to support interactive queries and to cold storage for archive purposes. According to various example embodiments, data is sent to the data lakes for offline analytics development. According to various example embodiments, the data pipeline layer 322 accesses the data stored in the databases of the data insight layer 324 to perform analytics, as detailed above.

The application services layer 326 includes one or more components for rules engines, workflow/notifications, KPI framework, insights (e.g., actionable insights), decisions, recommendations, machine learning, and/or an API for application services. The application services layer 326 enables building of applications 328a-d. The applications layer 328 includes one or more applications 328a-d of the IoT platform 301. For example, according to various example embodiments, the applications 328a-d includes a buildings application 328a, a plants application 328b, an aero application 328c, and other enterprise applications 328d. According to various example embodiments, the applications 328 includes general applications for portfolio management, asset management, autonomous control, and/or any other custom applications. According to various example embodiments, portfolio management includes the KPI framework and a flexible user interface (UI) builder. According to various example embodiments, asset management includes asset performance, asset health, and/or asset predictive maintenance. According to various example embodiments, autonomous control includes energy optimization and/or predictive maintenance. As detailed above, according to various example embodiments, the general applications 328a-d is extensible such that each application 328a-d is configurable for the different types of enterprises 304a-304n (e.g., buildings application 328a, plants application 328b, aero application 328c, and other enterprise applications 328d).

The applications layer 328 also enables visualization of performance of the enterprise 304a-304n. For example, dashboards provide a high-level overview with drill downs to support deeper investigations. In some example embodiments, the dashboards provide one or more insights related to faulty components or assets, underperforming assets, similarity levels between assets, and/or the like. In this regard, the dashboards provide one or more reasons or issues, opportunities, actions, recommendations, predictions, and/or the like as the one or more insights. Also, the dashboards provide one or more service cases based at least on the one or more insights. The one or more insights give users prioritized actions to address current or potential issues and opportunities. For example, a prioritized action can be to reject an onboarding of a new asset. In another example, a prioritized action can correspond to modifying a set point of an underperforming asset. Data analysis tools support ad hoc data exploration to assist in troubleshooting and process improvement.

The core services layer 330 includes one or more services of the IoT platform 301. According to various example embodiments, the core services 330 include data visualization, data analytics tools, security, scaling, and monitoring. According to various example embodiments, the core services 330 also include services for tenant provisioning, single login/common portal, self-service admin, UI library/ UI tiles, identity/access/entitlements, logging/monitoring, usage metering, API gateway/dev portal, and the IoT platform 301 streams.

Figure 4:
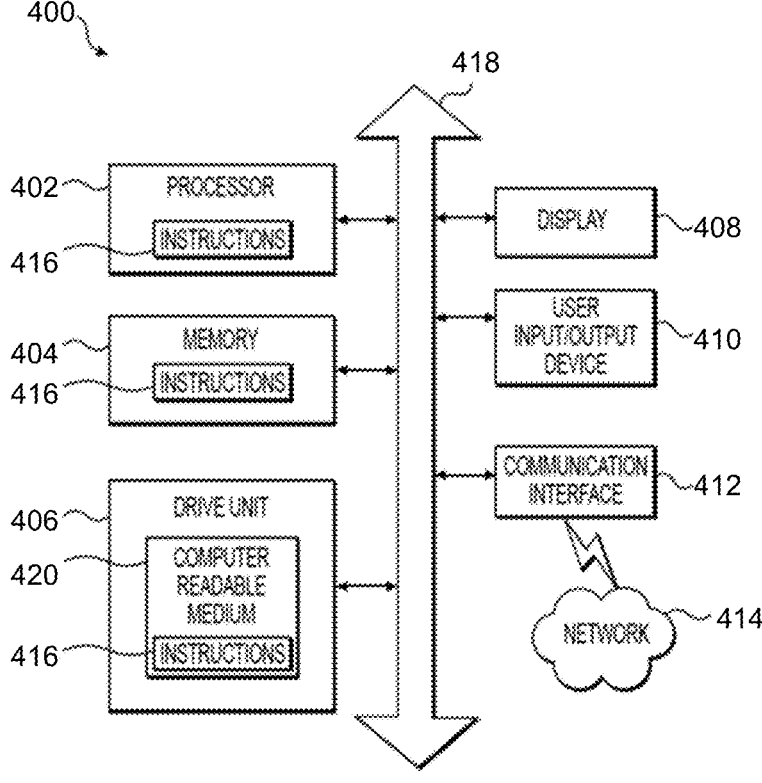
FIG. 4 illustrates a schematic diagram showing an implementation of a controller that executes techniques in accordance with one or more example embodiments described herein.

FIG. 4 illustrates a schematic diagram showing an implementation of a controller that may execute techniques in accordance with one or more example embodiments described herein. The controller 400 may include a set of instructions that can be executed to cause the controller 400 to perform any one or more of the methods or computer based functions disclosed herein. The controller 400 may operate as a standalone device or may be connected, e.g., using a network, to other computer systems or peripheral devices.

In a networked deployment, the controller 400 may operate in the capacity of a server or as a client in a server-client user network environment, or as a peer computer system in a peer-to-peer (or distributed) network environment. The controller 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 400 can be implemented using electronic devices that provide voice, video, or data communication. Further, while the controller 400 is illustrated as a single system, the term "system" shall also be taken to include any collection of systems or sub-systems that individually or jointly execute a set, or multiple sets, of instructions to perform one or more computer functions.

As illustrated in FIG. 4, the controller 400 may include a processor 402, e.g., a central processing unit (CPU), a graphics processing unit (GPU), or both. The processor 402 may be a component in a variety of systems. For example, the processor 402 may be part of a standard computer. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The controller 400 may include a memory 404 that can communicate via a bus 418. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 includes a cache or random-access memory for the processor 402. In alternative implementations, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the processor 402 executing the instructions stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the controller 400 may further include a display 408, such as a liquid crystal display (LCD), an organic light emitting diode (OLED), a flat panel display, a solid-state display, a cathode ray tube (CRT), a projector, a printer or other now known or later developed display device for outputting determined information. The display 408 may act as an interface for the user to see the functioning of the processor 402, or specifically as an interface with the software stored in the memory 404 or in the drive unit 406.

Additionally or alternatively, the controller 400 may include an input/output device 410 configured to allow a user to interact with any of the components of controller 400. The input/output device 410 may be a number pad, a keyboard, or a cursor control device, such as a mouse, or a joystick, touch screen display, remote control, or any other device operative to interact with the controller 400.

The controller 400 may also or alternatively include drive unit 406 implemented as a disk or optical drive. The drive unit 406 may include a computer-readable medium 420 in which one or more sets of instructions 416, e.g. software, can be embedded. Further, the instructions 416 may embody one or more of the methods or logic as described herein. The instructions 416 may reside completely or partially within the memory 404 and/or within the processor 402 during execution by the controller 400. The memory 404 and the processor 402 also may include computer-readable media as discussed above.

In some systems, a computer-readable medium 420 includes instructions 416 or receives and executes instructions 416 responsive to a propagated signal so that a device connected to a network 414 can communicate voice, video, audio, images, or any other data over the network 414. Further, the instructions 416 may be transmitted or received over the network 414 via a communication port or interface 412, and/or using a bus 418. The communication port or interface 412 may be a part of the processor 402 or may be a separate component. The communication port or interface 412 may be created in software or may be a physical connection in hardware. The communication port or interface 412 may be configured to connect with a network 414, external media, the display 408, or any other components in controller 400, or combinations thereof. The connection with the network 414 may be a physical connection, such as a wired Ethernet connection or may be established wirelessly as discussed below. Likewise, the additional connections with other components of the controller 400 may be physical connections or may be established wirelessly. The network 414 may alternatively be directly connected to a bus 418.

While the computer-readable medium 420 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 420 may be non-transitory, and may be tangible.

The computer-readable medium 420 can include a solid-state memory such as a memory card or other package that houses one or more non-volatile read-only memories. The computer-readable medium 420 can be a random-access memory or other volatile re-writable memory. Additionally or alternatively, the computer-readable medium 420 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 400 may be connected to a network 414. The network 414 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 414 may include wide area networks (WAN), such as the Internet, local area networks (LAN), campus area networks, metropolitan area networks, a direct connection such as through a Universal Serial Bus (USB) port, or any other networks that may allow for data communication. The network 414 may be configured to couple one computing device to another computing device to enable communication of data between the devices. The network 414 may generally be enabled to employ any form of machine-readable media for communicating information from one device to another. The network 414 may include communication methods by which information may travel between computing devices. The network 414 may be divided into sub-networks. The sub-networks may allow access to all of the other components connected thereto or the sub-networks may restrict access between the components. The network 414 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 5:
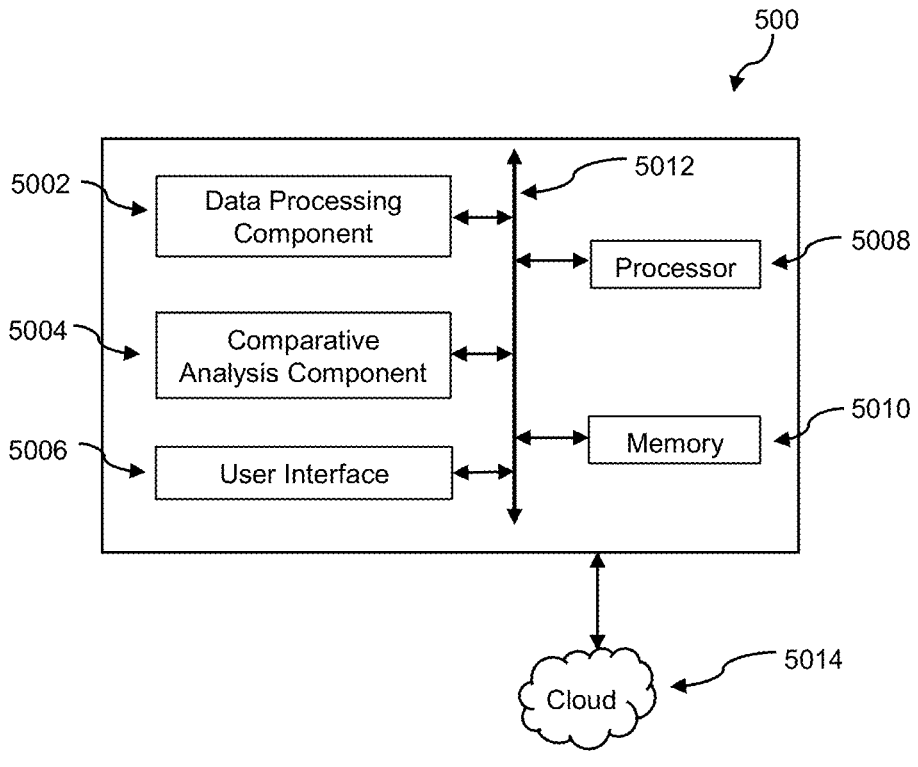
FIG. 5 illustrates a schematic diagram showing an exemplary asset management system in a facility in accordance with one or more example embodiments described herein.

FIG. 5 illustrates a schematic diagram showing an exemplary asset management system in a facility in accordance with one or more example embodiments described herein. In accordance with one or more example embodiments, the asset management system 500 manages diverse portfolio of assets (as described in FIGS. 1-3 of the current disclosure). In one or more example embodiments, the asset management system 500 described herein performs comparative analysis between the assets to manage the assets in the facility. In this regard, the asset management system 500 initially gathers data such as telemetry data and model data (as described in FIGS. 2 and 3 of the current disclosure) associated with the assets. Using the data, the asset management system 500 performs comparative analysis to infer similarity levels and quality associated with the assets. Based on the inferred similarity levels and quality, the asset management system 500 derives one or more insights associated with the assets. The one or more insights can be related to operating points, performance, configuration, etc., associated with the assets. In addition, in some example embodiments, the asset management system 500 undertakes relevant measures based on the one or more insights. Also, in some example embodiments, the asset management system 500 creates one or more service cases based at least on the one or more insights. Accordingly, the system 500 facilitates a practical application of data analytics technology and/or digital transformation technology to efficiently control and manage plurality of assets in the facility.

In some example embodiments, the asset management system 500 is a server system (e.g., a server device) that facilitates a data analytics platform between one or more computing devices, one or more data sources, and/or one or more assets. In one or more example embodiments, the asset management system 500 is a device with one or more processors and a memory. Also, in some example embodiments, the asset management system 500 is implementable via the cloud 106. The asset management system 500 is implementable in one or more facilities related to one or more technologies, for example, but not limited to, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

In some example embodiments, the asset management system 500 comprises one or more components such as data processing component 5002, comparative analysis component 5004, and/or user interface 5006. Additionally, in one or more example embodiments, the asset management system 500 comprises processor 5008 and/or memory 5010. In one or more example embodiments, one or more components of the asset management system 500 can be communicatively coupled to processor 5008 and/or memory 5010 via a bus 5012. In some example embodiments, one or more aspects of the asset management system 500 (and/or other systems, apparatuses and/or processes disclosed herein) constitute executable instructions embodied within a computer-readable storage medium (e.g., the memory 5010). For instance, the memory 5010 stores computer executable component and/or executable instructions (e.g., program instructions). Furthermore, the processor 5008 facilitates execution of the computer executable components and/or the executable instructions (e.g., the program instructions). In some example embodiments, the processor 5008 is configured to execute instructions stored in memory 5010 or otherwise accessible to the processor 5008.

The processor 5008 is a hardware entity (e.g., physically embodied in circuitry) capable of performing operations according to one or more embodiments of the disclosure. Alternatively, in some example embodiments where the processor 5008 is embodied as an executor of software instructions, the software instructions configure the processor 5008 to perform one or more algorithms and/or operations described herein in response to the software instructions being executed. In some example embodiments, the processor 5008 is a single core processor, a multi-core processor, multiple processors internal to the asset management system 500, a remote processor (e.g., a processor implemented on a server), and/or a virtual machine. In certain example embodiments, the processor 5008 is in communication with the memory 5010, the data processing component 5002, the comparative analysis component 5004, and/or the user interface 5006 via the bus 5012 to, for example, facilitate transmission of data between the processor 5008, the memory 5010, the data processing component 5002, the comparative analysis component 5004, and/or the user interface 5006. In some example embodiments, the processor 5008 may be embodied in a number of different ways and, in certain example embodiments, includes one or more processing devices configured to perform independently. Additionally or alternatively, in one or more example embodiments, the processor 5008 includes one or more processors configured in tandem via bus 5012 to enable independent execution of instructions, pipelining of data, and/or multi-thread execution of instructions.

The memory 5010 is non-transitory and includes, for example, one or more volatile memories and/or one or more non-volatile memories. In other words, in one or more example embodiments, the memory 5010 is an electronic storage device (e.g., a computer-readable storage medium). The memory 5010 is configured to store information, data, content, one or more applications, one or more instructions, or the like, to enable the asset management system 500 to carry out various functions in accordance with one or more embodiments disclosed herein. In accordance with some example embodiments described herein, the memory 5010 may correspond to an internal or external memory of the asset management system 500. In some examples, the memory 5010 may correspond to a database communicatively coupled to the asset management system 500. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In one or more example embodiments, the data processing component 5002 receives the data associated with the assets in the facility. In this regard, the data corresponds to the telemetry data and the model data associated with the assets. At times, the number of assets associated with the facility is subjected to variations that is, there can be temporarily added assets, temporarily deleted assets, replaced assets, damaged assets, under-service assets, yet to be installed assets, new assets to be added, newly onboarded assets, and/or the like in addition to other assets in the facility. More specifically, in some example embodiments, at least some of the assets can correspond to already installed assets in the facility whereas at least some of the other assets can correspond to yet to be installed assets in the facility. Per this aspect, the already installed assets can correspond to assets which are operational, newly onboarded assets, and/or the like in the facility. Whereas the yet to be installed assets can correspond to assets that are yet to be shipped to the facility, assets present at an unit of OEM, etc. Though such variations are often observed with respect to the facility, the data processing component 5002 acts a point of contact or a pipeline for ingesting the data from all of such assets in the facility.

In one or more example embodiments, the data received at the data processing component 5002 can be from one or more sources. In this regard, the one or more sources can be, but not limited to original equipment manufacturers (OEMs) of the assets, edge controllers (for instance, edge controllers 104 or edge controller 204) or gateways (for instance, gateway 202) installed in the facility, sensors associated with the assets, and/or the assets themselves. In some example embodiments, the data processing component 5002 receives, for instance, the telemetry data in near real time as a direct stream. Whereas in some example embodiments, the data processing component 5002 receives, for instance, the telemetry data in near real time as a batch. Yet in some example embodiments, the telemetry data can comprise historic data values as well. Also, in some example embodiments, the data processing component 5002 transmits interrogation requests to, for example, already installed assets to pull the telemetry data and the model data. In some example embodiments, OEMs of already installed assets can upload the telemetry data and the model data at the data processing component 5002 and/or the cloud 5014 as well. Further, the data processing component 5002 receives the telemetry data and the model data associated with, for example, yet to be installed assets at least from OEMs. Said alternatively, the OEMs can upload the telemetry data and the model data at the data processing component 5002 and/or the cloud 5014. In some example embodiments, the OEMs can upload the data at the data processing component 5002 and/or the cloud 5014 before shipping an asset to the facility. Accordingly, the data processing component 5002 initially gathers the data associated with the assets.

Further, in some example embodiments, the data processing component 5002 is configured to pre-process the received data associated with the assets. That is, the data processing component 5002 is configured to enrich and/or normalize the telemetry data and the model data associated with each of the plurality of assets based on analyses and/or tests associated with the comparative analysis. In this regard, the data processing component 5002 enriches the telemetry data and the model data with specific metadata. For example, the data processing component 5002 can tag the telemetry data and the model data with specific tags. Whereas the data processing component 5002 normalizes the telemetry data and the model data to have for example, uniform units of measurement or common engineering units, common communication protocols, and/or the like. For example, the data processing component 5002 can receive first set of temperature measurements in degree Celsius from a first asset, say a first chiller and second set of temperature measurements in degree Fahrenheit from a second asset, say a second chiller. To perform comparative analysis between the first and second chillers, the data processing component 5002 converts the second set of temperature measurements from degree Fahrenheit to degree Celsius, or the first set of temperature measurements from degree Celsius to degree Fahrenheit, or the first and second set of temperature measurements to a target unit of measurement. In another example, to communicate with Variable Air Volume (VAV) controllers supporting BACnet protocol, the data processing component 5002 is configured to communicate with the VAV controllers with BACnet protocol to pull the data from the VAV controllers. Accordingly, the enrichment and/or normalization of the telemetry data and the model data done by the data processing component 5002 facilitates the comparative analysis component 5004 to perform the comparative analysis between the assets. In this regard, the data processing component 5002 is configured to transmit the enriched and/or normalized data to the comparative analysis component 5004.

In some example embodiments described herein, the comparative analysis component 5004 receives the data (that is, telemetry data and model data) which is enriched and/or normalized from the data processing component 5002. Upon receipt of the data, the comparative analysis component 5004 can perform one or more analyses and/or tests using the data as part of the comparative analysis. Often the assets have certain level of overlap or similarity for instance, in view of manufacturer, a type of operation, a type of asset, etc., the comparative analysis described herein determines similarity levels between say, any two assets. In this regard, the analyses and/or tests facilitate determination of similarity levels between any two assets that are compared. For example, if two chillers of same manufacturers are compared, then the comparative analysis component 5004 performs the comparative analysis using data associated with both of the two chillers. Upon performing the comparative analysis, the component 5004 determines similarity levels between the chillers. The similarity levels determined by the comparative analysis component 5004 indicate an extent or a level up to which two assets are similar. Further, the component 5004 derives several insights from the determined similarity levels. For example, the comparative analysis performed for the chillers can determine insights related to operating points, performance, configuration, etc. Some examples of determined insights can correspond to determination if there is a reduction in performance of one of the chillers or if one of the chillers is about to fail or a component of one of the chillers is failed, etc.

In some example embodiments, the analyses and/or tests constituting the comparative analysis can correspond to, for example, parameter analysis, statistical tests, and application of machine learning models on the data associated with say, any two assets. In some example embodiments, the comparative analysis component 5004 is configured to perform the parameter analysis first followed by the statistical tests and application of machine learning models on the data. Per this aspect, the statistical tests and application of machine learning models correspond to time series analysis performed on telemetry data associated with each of the assets. The aforementioned order is exemplary only and the comparative analysis component 5004 can perform the analyses and tests in any other order as well. In accordance with some example embodiments, the comparative analysis component 5004 performs the comparative analysis between two assets such that one of the asset is a best performing or baseline or golden asset with close to ideal characteristics. In accordance with some example embodiments, the comparative analysis component 5004 performs the parameter analysis using model data associated with respective assets. Said alternatively, the comparative analysis component 5004 can use asset models and/or metadata from the model data to perform the parameter analysis. Further, the comparative analysis component 5004 determines a first similarity score indicative of how similar two assets are in view of configuration and parameters. For example, if two boilers are compared to determine similarity levels, the comparative analysis component 5004 compares asset models and/or metadata from model data of each of the boilers to determine similarity levels between the two boilers. Then, the comparative analysis component 5004 determines a first similarity score indicative of a similarity level i.e., how similar two boilers are in view of configuration and parameters. Further, in accordance with some example embodiments, the comparative analysis component 5004 performs the statistical tests using telemetry data associated with each of the assets. In this regard, the comparative analysis component 5004 can select telemetry data of a specific time interval. Upon performing the statistical tests, the comparative analysis component 5004 determines a second similarity score indicative of a similarity level i.e., how similar two assets are based on stationarity between telemetry data of the assets. For example, the comparative analysis component 5004 performs the statistical tests using telemetry data associated with each of the boilers. Upon performing the statistical tests, the comparative analysis component 5004 determines a second similarity score indicative of how similar two boilers are based on stationarity between telemetry data of the respective boilers. Also, in accordance with some example embodiments, the comparative analysis component 5004 applies the one or more machine learning models on telemetry data of respective assets. In this regard, the comparative analysis component 5004 determines factors such as seasonality, cyclicity, and trend associated with telemetry data of respective assets. As a result of application of the one or more machine learning models, the comparative analysis component 5004 determines a third similarity score indicative of a similarity level i.e., how similar two assets are based on the determined factors. For example, the comparative analysis component 5004 applies the one or more machine learning models on telemetry data of the respective boilers. In this regard, the comparative analysis component 5004 determines factors such as seasonality, cyclicity, and trend associated with telemetry data of the respective boilers. As a result of application of the one or more machine learning models, the comparative analysis component 5004 determines a third similarity score indicative of how similar two boilers are based on the determined factors.

Further, in accordance with some example embodiments, the comparative analysis component 5004 based on the first, second, and third similarity scores identifies a similarity between two assets for example, between the two boilers. In this regard, the comparative analysis component 5004 applies a function on the first, second, and third similarity scores to determine the similarity. In this regard, the function can be, but not limited to computation of geometric mean, harmonic mean, and/or the like. Also, in some example embodiments, the comparative analysis component 5004 can provide a similarity score based on the first, second, and third similarity scores such that the similarity score indicates the similarity level between the two assets. The comparative analysis component 5004 also determines that two assets are similar if the similarity score is within a threshold value and dissimilar if the similarity score is beyond the threshold value. If the similarity score is beyond the threshold value, the identified similarity can then be used to derive insights associated with the assets. For example, similarity or delta in similarity between the boilers can be used to identify faulty components in one of the boilers, set points responsible for underperformance of one of the boiler, factors responsible for degradation of one of the boiler, etc. Based on the derived insights, actions such as rejecting an onboarding of one of the boilers, replacing or servicing one of the boilers, and/or the like can be provided as well. In some example embodiments, the derived insights can constitute for the actions as well. Also, the identified similarity can be used to provide predictions for example, regarding underperformance, malfunctioning, and/or failure of assets or its associated components. For example, similarity or delta in similarity between the boilers can be used to predict a failure of a particular component in one of the boiler. Additionally, in some example embodiments, the comparative analysis component 5004 can undertake measures based on the derived insights to manage the assets as well. Accordingly, the identified similarity facilitates predictive maintenance of assets and identification of relative performance of assets thereby ensuring efficient management of portfolio of assets in the facility. An exemplary comparative analysis component is also described in more details in accordance with FIG. 5A of the current disclosure.

Further, in one or more example embodiments, the derived insights by the comparative analysis component 5004 can be transmitted to the user interface 5006. In some example embodiments, the user interface 5006 can correspond to a display of a mobile device associated with a personnel in the facility. Whereas in some example embodiments, the user interface 5006 can correspond to an interface or a display of any other device present in the facility as well. In this regard, the derived insights can be rendered as a dashboard on the user interface 5006. In some example embodiments, the dashboard provides rankings and/or performance of the assets in the facility. Also, in some example embodiments, the dashboard provides relative performance of at least some of the assets with respect to the best performing assets in the facility. Yet in some example embodiments, the dashboard provides one or more service cases based on the derived insights. In this regard, the one or more service cases provide details of one or more actions that can be taken, for instance, by personnel in the facility to manage the portfolio of assets in the facility.

In some example embodiments, one or more components, processor 5008 and/or memory 5010 of the asset management system 500 may be communicatively coupled to the cloud 5014 over a network. In this regard, one or more components, processor 5008 and/or memory 5010 along with the cloud 5014 can compare assets to monitor performance and/or operations associated with the assets in the facility. In some example embodiments, the network may be for example, a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, a BACnet network, a NIAGARA network, a NIAGARA CLOUD network, and/or another type of network. In some example embodiments, the data associated with the assets can be transmitted to the cloud 5014. According to some example embodiments, the asset management system 500 may additionally comprise a gateway. In this regard, the gateway may be configured to transmit data received from edge controllers (for ex., edge controllers 104 or edge controller 204) and/or from OEMs to the cloud 5014. Further, in some example embodiments, the cloud 5014 can be configured to perform analysis on the data and/or derive the insights based on the analysis of the data. Further, in some example embodiments, the cloud 5014 can transmit the one or more insights to the user interface 5006 for display. Also, in some example embodiments, the cloud 5014 can create one or more models associated with performance of assets, operations of assets, relative performance of assets, and/or the like. In some example embodiments, the cloud 5014 may be configured to perform one or more operations/functionalities of one or more components, processor 5008 and/or memory 5010 of the asset management system 500 in order to manage the portfolio of assets in the facility.

Figure 5A:
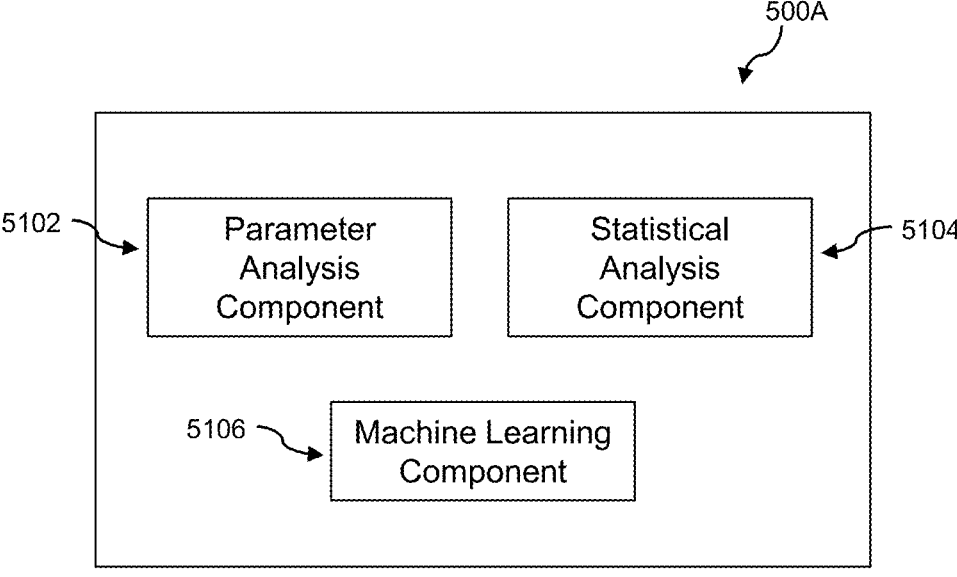
FIG. 5A illustrates a schematic diagram showing an exemplary comparative analysis component in accordance with one or more example embodiments described herein.

FIG. 5A illustrates a schematic diagram showing an exemplary comparative analysis component in accordance with one or more example embodiments described herein. An example comparative analysis component 500A illustrated herein is same as comparative analysis component 5004 described in FIG. 5 of the current disclosure. In accordance with some example embodiments, the comparative analysis component 500A further comprises one or more sub-components such as parameter analysis component 5102, statistical analysis component 5104, and/or machine learning component 5106. The one or more sub-components are communicatively coupled to each other. The aforementioned sub-components facilitate the comparative analysis component 500A to perform comparative analysis (for instance, as described in FIG. 5 of the current disclosure) between say, any two assets associated with a facility. In some example embodiments described herein, the comparative analysis component 500A performs the comparative analysis between assets associated with the facility irrespective of whether at least some of the assets are already installed in the facility or whether at least some of the assets are yet to be installed in the facility. For example, the comparative analysis component 500A performs the comparative analysis between a best performing asset already installed in the facility and another asset that is to be installed in the facility. Additionally, in some example embodiments, the comparative analysis component 500A facilitates the comparative analysis between assets that belong to same or different facility as well. Said alternatively, the comparative analysis component 500A performs the comparative analysis between the assets irrespective of a geographical location of a facility in which an asset is located. For example, a first HVAC unit can be already installed in a first portion of a pharmaceutical unit and a second HVAC unit can be a new incoming asset that is yet to be installed at a second portion of the same pharmaceutical unit. In another example, a first chiller can be present in a manufacturing unit of OEM and a second chiller can be already installed in a factory. Despite such diversifications as described in the aforementioned examples, the comparative analysis component 500A performs the comparative analysis to manage portfolio of assets in associated facilities.

Initially, in accordance with some example embodiments, the parameter analysis component 5102 performs parameter analysis using model data associated with the assets. Said alternatively, the parameter analysis component 5102 uses asset models and/or metadata from the model data to perform the parameter analysis. For example, to perform the parameter analysis between two assets say, a first asset and a second asset, the parameter analysis component 5102 uses model data associated with each of the first asset and the second asset. In this regard, the model data comprises, for instance, configuration data and/or parameter data associated with the assets. The configuration data comprises at least one of hierarchical information, spatial relationship, geographical information (e.g., location of an asset), configuration information (hardware and/or software information), datasheet information associated with the assets, etc. Whereas the parameter data comprises at least one of names associated with asset parameters (a data type or a data format associated with data transacted through an asset), a type of set point (e.g., sensor setting based on which a sensor is commissioned), a role of the set point, relationship between the asset parameters (e.g., a relationship of one asset with one or more other assets), statistics associated with the set point and the asset parameters, etc. The model data can also be indicative of or can additionally comprise ancillary or contextual information associated with the assets.

In accordance with some example embodiments, the parameter analysis performed by the parameter analysis component 5102 acts as a one on one comparison between the model data associated with the respective assets. In this regard, the parameter analysis component 5102 compares configuration data and/or parameter data of one asset and configuration data and/or parameter data of another asset. For example, to perform the parameter analysis between the first asset and the second asset, the parameter analysis component 5102 firstly compares configuration data of the first asset with configuration data of the second asset. That is, the parameter analysis component 5102 compares, for instance, spatial relationship of each of the first asset and the second asset, configuration information of each of the first asset and the second asset, datasheet information of each of the first asset and the second asset, and/or the like. Secondly, the parameter analysis component 5102 compares parameter data of the first asset with parameter data of the second asset. That is, the parameter analysis component 5102 compares, for instance, names associated with asset parameters of each of the first asset and the second asset, a type of set point of each of the first asset and the second asset, a role of set point of each of the first asset and the second asset, relationship between the asset parameters of each of the first asset and the second asset, and/or the like. In this regard, based on the comparison, the parameter analysis component 5102 determines similarity levels between the assets i.e., the first asset and the second asset in view of configuration and parameters associated with the first and second assets. Said alternatively, the parameter analysis component 5102 determines similarity (or dissimilarity) in configuration of the first and second assets, similarity (or dissimilarity) in parameters of the first and second assets, and/or the like. The similarity levels between the assets facilitates determination of several insights associated with the assets.

In some example embodiments, the parameter analysis component 5102 determines, based on the comparison, a first similarity score indicative of how similar the assets are i.e., the first and second assets are in view of configuration and parameters. In this regard, the first similarity score can be indicative of a value or a percentage indicating similarity level between the first and second assets in view of configuration and parameters. Accordingly, the first similarity score can represent relative similarity of the first and second assets. In some example embodiments, upon determining that the first similarity score is beyond a first threshold value, the parameter analysis component 5102 provides the insights along with the actions. In this regard, the insights and the actions are based at least on the similarity levels and/or the first similarity score. Additionally, in some example embodiments, the parameter analysis component 5102 considers hierarchy of assets to perform the parameter analysis between the assets. In this regard, a hierarchy for an asset can comprise a sensor of the asset, a part of the asset, a component of the asset, the asset itself, and a system in the facility to which the asset belongs to. Accordingly, the parameter analysis component 5102 can perform the parameter analysis between the assets at any hierarchical level. For example, the parameter analysis component 5102 can initially perform the parameter analysis between the first and second assets itself. However, to further compare and have granular level of details, the parameter analysis component 5102 can perform the parameter analysis between a first sensor of the first asset and a second sensor of the second asset. Then, the parameter analysis component 5102 can perform the parameter analysis between a first part of the first asset and a second part of the second asset as well.

Further, in some example embodiments, the insights determined by the parameter analysis component 5102 are based on a context for example, based on if an asset is yet to be installed or is already installed in the facility. For example, if the first asset corresponds to a newly manufactured asset at a site of OEM, then the comparison of the first asset with the second asset in the facility that corresponds to the best performing asset can be used to determine insights for the first asset. In this regard, the parameter analysis component 5102 determines if there is a difference in a specific configuration, for instance, a software version, hardware installed in the first asset with respect to the second asset, if there is a difference with respect to datasheet information of the first asset with respect to the second asset, if there is a difference in number of operating set points in the first asset with respect to the second asset, if there is a difference in naming convention of set points in the first asset with respect to the second asset, if there is an extent up to which datasheet information of the first and second assets is similar, and/or the like. Accordingly, based on the insights, the parameter analysis component 5102 determines, for instance, if the first asset can be shipped from the site of OEM to the facility where it is to be installed. If the first asset fails in comparison of certain specific configuration and/or parameters, then one or more actions can be suggested. In this regard, the one or more actions can be, but not limited to rejecting shipment of the first asset from the OEM, rejecting an acceptance of the first asset, providing recommendation(s) to the OEM for correcting specific configuration and/or parameters based on a requirement in the facility, and/or the like. Thus, the parameter analysis performed by the parameter analysis component 5102 serves as a qualifying test to approve assets say, that are to be onboarded to the facility. In another example, if the first asset corresponds to an already installed asset in the facility, then the comparison of the first asset with the second asset in the facility that corresponds to the best performing asset can be used to determine insights for the first asset. In this regard, the parameter analysis component 5102 determines if there is a difference in a specific configuration, for instance, a software version, hardware installed in the first asset with respect to the second asset, if there is a degradation or reduction in performance of the first asset with respect to the second asset, if there is a change in geographical location of the first asset with respect to the second asset, if there is a difference in set point of the first asset with respect to the second asset, if there is an extent up to which operating boundaries of the first and second assets is similar, and/or the like. Accordingly, the parameter analysis component 5102 determines if the first asset is about to fail, if there is a faulty component in the first asset, if a particular set point of the first asset is responsible for underperformance of the first asset, if the first asset needs to be serviced, if component(s) or the first asset needs to be replaced, and/or the like. If the first asset fails in comparison of certain specific configuration and/or parameters, then one or more actions can be suggested. In this regard, the one or more actions can be, but not limited to replacing the first asset or component(s) of the first asset, altering an operation of the first asset based on the second asset, servicing the first asset, and/or the like.

Further, in accordance with some example embodiments, the statistical analysis component 5104 performs statistical tests using telemetry data (alternatively referred as 'telemetry dataset') associated with the assets. For example, to perform the statistical tests between two assets say, the first asset and the second asset, the statistical analysis component 5104 uses telemetry data associated with each of the first asset and the second asset. In this regard, the telemetry data comprises historic and/or near-real time data values associated with the assets. For instance, the telemetry data can comprise data values sensed by one or more sensors for 1 hour, 1 month, and/or the like of an asset. Further, in this regard, the telemetry data also comprises test data values associated with the assets as well. In accordance with some example embodiments, the statistical tests performed by the statistical analysis component 5104 corresponds to application of one or more stationarity tests on the telemetry data associated with the assets. Per this aspect, the one or more stationarity tests can be, but not limited to a Kwiatkowski-Phillips-Schmidt-Shin (KPSS) test, an Augmented Dickey-Fuller (ADF) test, and/or the like. The application of the one or more stationarity tests described herein on the telemetry data facilitates identification of stationarity between the telemetry data of respective assets. That is, for example, if the one or more stationarity tests are applied on first telemetry data of the first asset and second telemetry data of the second asset, then the one or more stationarity tests identify stationarity between the first telemetry data and the second telemetry data.

Further, in some example embodiments, to identify the stationarity between the telemetry data of the respective assets, the one or more stationarity tests compute one or more values as well. In this regard, the one or more values comprise a baseline mean value, a sigma baseline value, a mean value of an associated asset, a baseline standard deviation value, and/or a standard deviation value of an associated asset. Also, in some example embodiments, the statistical analysis component 5104 determines an upper threshold mean value and a lower threshold mean value using the baseline mean value and the sigma baseline value. Per this aspect, the statistical analysis component 5104 compares the telemetry data of an associated asset with the baseline mean value. Also, the statistical analysis component 5104 compares the mean value of an associated asset with the baseline mean value. For example, for the first asset and the second asset, the statistical analysis component 5104 compares the first telemetry data of the first asset with the baseline mean value and the second telemetry data of the second asset with the baseline mean value. Further, the statistical analysis component 5104 can compare the mean value of the first asset with the baseline mean value and the mean value of the second asset with the baseline mean value as well. Then, in some example embodiments, the statistical analysis component 5104 determines if the comparison of the mean value and/or the telemetry data of an associated asset with the baseline mean value violates the upper threshold mean value and/or the lower threshold mean value. This facilitates identification of those assets that violate limits defined by the upper threshold mean value and/or the lower threshold mean value. For example, if the comparison done for the first asset violates the upper threshold mean value and/or the lower threshold mean value, the statistical analysis component 5104 determines that the first asset violates the limits. Also, in some example embodiments, the statistical analysis component 5104 compares the standard deviation value and/or the telemetry data of an associated asset with the baseline standard deviation value as well. An exemplary graphical representation of comparison of a mean value of an associated asset with a baseline mean value is described in accordance with FIG. 5B of the current disclosure. Also, an exemplary console rendering details associated with a statistical test is described in accordance with FIG. 5C of the current disclosure.

Also, in some example embodiments, based on the comparison, the statistical analysis component 5104 determines a variability associated with each of the telemetry datasets and/or associated mean values with respect to the baseline mean value. Additionally, in some example embodiments, the statistical analysis component 5104 also determines the variability associated with each of the telemetry datasets and/or associated standard deviation values with respect to the baseline standard deviation value as well. Further, in some example embodiments, the statistical analysis component 5104 determines a comparison score based on the comparison and/or the variability such that the comparison score indicates a similarity level between the telemetry data of the respective assets. For example, based on the comparison and/or the variability associated with each of the first and second telemetry datasets, the statistical analysis component 5104 determines the comparison score indicative of the similarity level between the first and second telemetry datasets. Also, if the comparison score is within a predefined threshold, the statistical analysis component 5104 determines that the telemetry data of the respective assets are similar. In accordance with some example embodiments, the similarity level between the telemetry data of the respective assets facilitates determination of several insights associated with the assets. Further, in accordance with some example embodiments, based at least on the comparison score and the similarity level, the statistical analysis component 5104 determines the stationarity between the telemetry data of the respective assets. Then, in accordance with some example embodiments, the statistical analysis component 5104 determines a second similarity score for the assets based on the stationarity between the telemetry data of the respective assets. Per this aspect, the second similarity score indicates how similar the assets are based on the stationarity between telemetry data of the respective assets. In this regard, the second similarity score can be indicative of a value or a percentage indicating similarity level between the assets. Accordingly, the second similarity score can represent relative similarity between the assets. For example, the second similarity score for the first and second assets can be indicative of how similar the first asset is with respect to the second asset. In some example embodiments, the statistical analysis component 5104 provides the insights along with the actions upon determining that the second similarity score is beyond a second threshold value. In this regard, the insights and the actions are based at least on the similarity levels and/or the second similarity score.

Further, in some example embodiments, the insights determined by the statistical analysis component 5104 are based on a context for example, based on if an asset is yet to be installed or is already installed in the facility. For example, if the first asset corresponds to a newly manufactured asset at a site of OEM, then the comparison of the first telemetry data with the second telemetry data of the best performing asset can be used to determine insights for the first asset. In this regard, the statistical analysis component 5104 determines if performance of the first asset is close to performance of the second asset, if operating set points of the first asset are same as that of the second asset, if sensors installed by the OEM in the first asset are similar to sensors installed in the second asset, and/or the like. Accordingly, based on the insights, the statistical analysis component 5104 determines, for instance, if the first asset can be shipped from the site of OEM to the facility where it is to be installed. If the first asset fails for performance, operating set points, sensor similarity, and/or the like, then one or more actions can be suggested. In this regard, the one or more actions can be, but not limited to rejecting shipment of the first asset from the OEM, rejecting an acceptance of the first asset, providing recommendation(s) to the OEM for installing an appropriate sensor in the first asset, setting appropriate operational boundaries for set points associated with the first asset, and/or the like. In another example, if the first asset corresponds to an already installed asset in the facility, then the comparison of the first telemetry data with the second telemetry data of the best performing asset can be used to determine insights for the first asset. In this regard, the statistical analysis component 5104 determines if performance of the first asset is close to performance of the second asset, if operating set points of the first asset are same as that of the second asset, if a particular set point of the first asset is responsible for underperformance of the first asset, if sensors of the first asset are about to fail or need servicing, and/or the like. If the first asset fails for performance, operating set points, sensor failure, and/or the like, then one or more actions can be suggested. In this regard, the one or more actions can be, but not limited to replacing the first asset or component(s) of the first asset, altering an operation of the first asset based on the second asset, servicing the first asset, and/or the like.

In accordance with some example embodiments, the machine learning component 5106 applies one or more machine learning models on the telemetry data of the respective assets. For example, to perform the comparative analysis between the first and second assets, the machine learning component 5106 applies the one or more machine learning models on the first telemetry data and the second telemetry data as well. In accordance with some example embodiments, the one or more machine learning models comprise Holts-Winter Exponential Smoothing technique, Auto-Regressive Integrated Moving Average (ARIMA) models, Moving Average (MA) models, and/or the like. The application of the one or more machine learning models on each of the telemetry datasets facilitates identification of factors such as seasonality, cyclicity, and trend associated with the respective telemetry datasets. Per this aspect, the seasonality represents a pattern associated with at least a portion of the telemetry dataset that repeats at specific or fixed intervals of time whereas the cyclicity represents a pattern associated with at least a portion of the telemetry dataset that repeats at unspecific or unfixed intervals of time. Then, the trend represents a pattern with an overall increase or decrease in at least a portion of the telemetry dataset over a specific period of time. For example, application of the one or more machine learning models on the first telemetry data facilitates identification of the factors i.e., seasonality, cyclicity, and trend associated with the first telemetry data. In accordance with some example embodiments, the machine learning component 5106 determines rolling mean and rolling standard based on the application of the one or more machine learning models on data values of the respective telemetry datasets. In this regard, the rolling mean and the rolling standard values facilitate identification of the factors i.e., seasonality, cyclicity, and trend associated with each of the telemetry datasets. For example, application of the one or more machine learning models on the data values of the first telemetry data determines the rolling mean and the rolling standard values for the first telemetry data. These rolling mean and rolling standard values can be further used to identify the factors i.e., seasonality, cyclicity, and trend associated with the first telemetry data. Per this aspect, based on variations observed in rolling mean and rolling standard values, the machine learning component 5106 identifies the factors i.e., seasonality, cyclicity, and trend associated with the telemetry dataset.

Also, in accordance with some example embodiments, the one or more machine learning models can be applied on the data values of the telemetry datasets for specific time frame. In this regard, the time frame can correspond to minutes, hours, days, months, or years. For example, while performing the comparative analysis between the first and second assets, the machine learning component 5106 can choose 30 days as the specific time frame and apply the one or more machine learning models on the data values of each of the first telemetry data and the second telemetry data, for past 30 days. Further, the machine learning component 5106 in this example can identify the factors associated with each of the first telemetry data and the second telemetry data, for the time frame of 30 days. In accordance with some example embodiments, the machine learning component 5106 can select multiple time frames and apply the one or more machine learning models on data values of the corresponding time frame. In this regard, the machine learning component 5106 determines the rolling mean and the rolling standard values at each time frame. Further, in this regard, the machine learning component 5106 analyzes the rolling mean and the rolling standard values at each time frame to obtain granular level of details for the factors. An exemplary graphical representation of seasonality, trend, and cyclicity of telemetry data at multiple time frames is described in more details in accordance with FIG. 5D of the current disclosure. Also, in some example embodiments, the statistical analysis component 5104 can perform the statistical tests on the data values of the telemetry datasets for one or more specific time frames as well.

In accordance with some example embodiments described herein, the machine learning component 5106 then compares the factors associated with the respective telemetry datasets as a part of the comparative analysis. For example, to perform the comparative analysis between the first and second assets, the machine learning component 5106 compares seasonality associated with each of the first and second telemetry datasets, cyclicity associated with each of the first and second telemetry datasets, and lastly trend associated with each of the first and second telemetry datasets. Further, in accordance with some example embodiments, the machine learning component 5106 determines similarity (or dissimilarity) between the factors of the respective assets based on the comparison. Based on the similarity (or dissimilarity) between the factors, the machine learning component 5106 determines a similarity level between the telemetry data of the respective assets. For example, the similarity level between the first and second telemetry datasets is determined based on the similarity (or dissimilarity) between the factors associated each of the first and second telemetry datasets. Then, in accordance with some example embodiments, the machine learning component 5106 determines a third similarity score for the respective assets based on the similarity level between the telemetry datasets of the respective assets. In this regard, the third similarity score indicates how similar the assets are based on the similarity associated with the factors. In this regard, the third similarity score can be indicative of a value or a percentage indicating similarity level between the assets. Accordingly, the third similarity score can represent relative similarity between the assets. For example, the third similarity score for the first and second assets can be indicative of how similar the first asset is with respect to the second asset. In some example embodiments, upon determining that the third similarity score exceeds a third threshold value, the machine learning component 5106 provides the insights along with the actions. In this regard, the insights and the actions are based at least on the similarity levels and/or the third similarity score. Additionally, in some example embodiments, the machine learning component 5106 provides predictions based at least on the similarity levels and/or the third similarity score as well.

Further, in some example embodiments, the insights determined by the machine learning component 5106 are based on a context for example, based on if an asset is yet to be installed or is already installed in the facility. For example, if the first asset corresponds to a newly manufactured asset at a site of OEM, then the comparison of the first telemetry data with the second telemetry data of the best performing asset can be used to determine insights for the first asset. In this regard, the machine learning component 5106 determines if performance of the first asset is close to performance of the second asset, if operating set points of the first asset are same as that of the second asset, if there is any noise in the telemetry data associated with the first asset with respect to the telemetry data associated with the second asset based on the compared factors, if health of the first asset is as per the specifications requested from the facility, and/or the like. Accordingly, based on the insights, the machine learning component 5106 determines, for instance, if the first asset can be shipped from the site of OEM to the facility where it is to be installed. If the first asset fails for performance, operating set points, noisy telemetry data, and/or the like, then one or more actions can be suggested. In this regard, the one or more actions can be, but not limited to rejecting shipment of the first asset from the OEM, rejecting an acceptance of the first asset, providing recommendation(s) to the OEM for correcting noise associated with data values sent from an appropriate sensor in the first asset, setting appropriate operational boundaries for set points associated with the first asset, and/or the like. In another example, if the first asset corresponds to an already installed asset in the facility, then the comparison of the first telemetry data with the second telemetry data of the best performing asset can be used to determine insights for the first asset. In this regard, the machine learning component 5106 determines if performance of the first asset is close to performance of the second asset, if operating set points of the first asset are same as that of the second asset, if there is noise in telemetry data of the first asset with respect to the second asset based on the compared factors, if a particular set point of the first asset is responsible for underperformance of the first asset, if sensors of the first asset are about to fail or need servicing, if health of the first asset is deteriorating with respect to the second asset, and/or the like. If the first asset fails for performance, operating set points, noisy telemetry data, sensor failure, and/or the like, then one or more actions can be suggested. In this regard, the one or more actions can be, but not limited to replacing the first asset or component(s) of the first asset, altering an operation of the first asset based on the second asset, servicing the first asset, and/or the like.

Additionally, in some example embodiments, the predictions provided by the machine learning component 5106 are based on a context for example, based on if an asset is yet to be installed or is already installed in the facility. For example, if the first asset corresponds to a newly manufactured asset at a site of OEM, then the comparison of the first telemetry data with the second telemetry data of the best performing asset can be used to provide predictions for the first asset. In this regard, the machine learning component 5106 can predict if a performance of the first asset lowers with time if installed in the facility, if at least one component of the first asset fails to operate as per the expected performance if the first asset is installed in the facility, if the first asset can operate for next 2 years with a performance same as that at the time of installation, if health of the first asset will deteriorate over a specific time frame, and/or the like. Accordingly, based on the predictions, the machine learning component 5106 determines, for instance, if the first asset can be shipped from the site of OEM to the facility where it is to be installed. If the first asset fails for performance, health deterioration, and/or the like, then one or more actions can be suggested. In this regard, the one or more actions can be, but not limited to rejecting shipment of the first asset from the OEM, rejecting an acceptance of the first asset, providing recommendation(s) to the OEM for correcting specific configurations and/or parameters for improving the performance, and/or the like. In another example, if the first asset corresponds to an already installed asset in the facility, then the comparison of the first telemetry data with the second telemetry data of the best performing asset can be used to provide predictions for the first asset. In this regard, the machine learning component 5106 can predict if performance of the first asset gets lowered relative to performance of the second asset over a specific time frame, if operating set points of the first asset is about to deviate relative to operating set points of the second asset, if at least one sensor or component of the first asset is about to fail or needs servicing after a specific time frame, if a particular set point of the first asset constitutes for underperformance of the first asset after a specific time frame, and/or the like. If the predictions for first asset fails for performance, operating set points, sensor failure, and/or the like, then one or more actions can be suggested. In this regard, the one or more actions can be, but not limited to replacing the first asset or component(s) of the first asset, altering an operation of the first asset based on the second asset, servicing the first asset, scheduling a predictive maintenance for the first asset, and/or the like.

Also, in accordance with some example embodiments, the machine learning component 5106 generates telemetry data for the assets if there is insufficient data associated with the assets. For instance, the statistical analysis component 5104 and the machine learning component 5106 can choose to say, a time frame of 30 days to perform the statistical tests and apply the machine learning models, respectively. In this regard, the comparative analysis component 500A requires telemetry data of 30 day time frame. However, depending on a context for example, based on if an asset is yet to be installed or is already installed in the facility, there can be situations that lead to insufficient data from the assets. For example, if an asset is at a site of OEM and is yet to be shipped to the facility, then the OEM can have telemetry data of the asset for 7 days which is less than the 30 day time frame. In another example, if an asset is already installed in the facility, then the asset can be downtime at times leading to loss of telemetry data. Also, in some examples, a size of the first telemetry data of the first asset can be less than that of the second telemetry data of the second asset. In such situations where there is insufficient data for an asset, the machine learning component 5106 generates telemetry data for the asset based at least on model data and/or historical telemetry data associated with the asset. In this regard, the one or more machine learning models generates the required telemetry data for the asset. Accordingly, the comparative analysis component 500A facilitates the comparative analysis between the assets using the parameter analysis component 5102, the statistical analysis component 5104, and the machine learning component 5106. Though some example embodiments describe the comparative analysis between two assets, the analysis can be performed between more than two assets as well. Also, in some example embodiments, the comparative analysis component 500A can perform the comparative analysis between processes handled by respective assets as well.

Figure 5B:
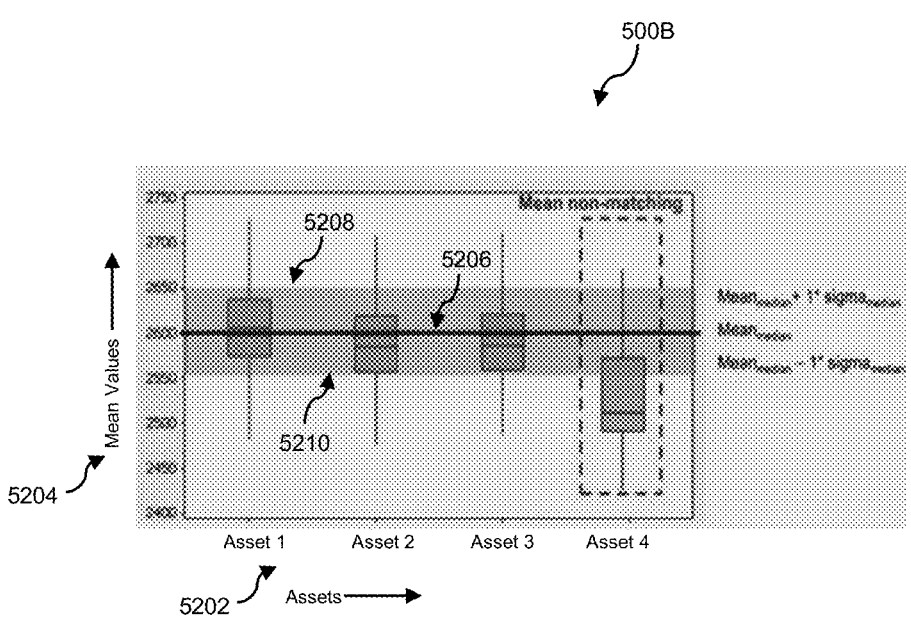
FIG. 5B illustrates an exemplary graphical representation of comparison of a mean value of an associated asset with a baseline mean value in accordance with one or more example embodiments described herein.

FIG. 5B illustrates an exemplary graphical representation of comparison of a mean value of an associated asset with a baseline mean value in accordance with one or more example embodiments described herein. An example graph 500B described herein comprises assets being represented along axis 5202 whereas mean values being represented along axis 5204. Though the axis 5202 represents only four exemplary assets i.e., asset 1, asset 2, asset 3, and asset 4, the axis 5202 can represent any number of assets or other assets associated with a facility too. Similarly, the mean values represented along the axis 5204 are exemplary only and the mean values are not limited to the values represented along the axis 5204. In this regard, the axis 5204 can represent any number of mean values as well. Also, in some example embodiments, the axis 5204 can represent telemetry data values as well. Further, the exemplary graph 500B comprises a baseline mean value 5206 which acts a reference or a baseline value for comparing mean value and/or telemetry data of an associated asset. Based at least on the baseline mean value 5206 and a sigma baseline value, the statistical analysis component 5104 (as described in FIG. 5A of the current disclosure) determines an upper threshold mean value 5208 and a lower threshold mean value 5210. In this regard, the statistical analysis component 5104 adds the baseline mean value 5206 and the sigma baseline value to determine the upper threshold mean value 5208 whereas the statistical analysis component 5104 subtracts the baseline mean value 5206 from the sigma baseline value to determine the lower threshold mean value 5210. Also, in some example embodiments, the statistical analysis component 5104 can perform or use other functions to determine the upper threshold mean value 5208 and the lower threshold mean value 5210 as well.

In accordance with some example embodiments, the statistical analysis component 5104 compares mean value associated with each of the assets with the baseline mean value 5206. For example, as illustrated in the graph 500B, the statistical analysis component 5104 compares mean value associated with each of the asset 1, asset 2, asset 3, and asset 4 with the baseline mean value 5206. Then, in some example embodiments, based on the comparison the statistical analysis component 5104 determines if mean value of an associated asset violates the upper threshold mean value 5208 and/or the lower threshold mean value 5210. For example, as illustrated in the graph 500B, the comparison of mean values for asset 1, asset 2, and asset 3 is within the upper threshold mean value 5208 and the lower threshold mean value 5210. While the comparison of mean value for asset 4 violates the lower threshold mean value 5210 and corresponds to a non-matching mean value. Accordingly, the statistical analysis component 5104 identifies asset 4 as that asset which violates a limit defined by the lower threshold mean value 5210. Further, in some example embodiments, the statistical analysis component 5104 determines a variability associated with each of the mean values with respect to the baseline mean value. Then, the statistical analysis component 5104 determines a comparison score for the assets based at least on the variability as described in FIG. 5A of the current disclosure. Also, in some example embodiments, the graph 500B can be rendered on the user interface 5006 (as described in FIG. 5 of the current disclosure) as well.

Figure 5C:
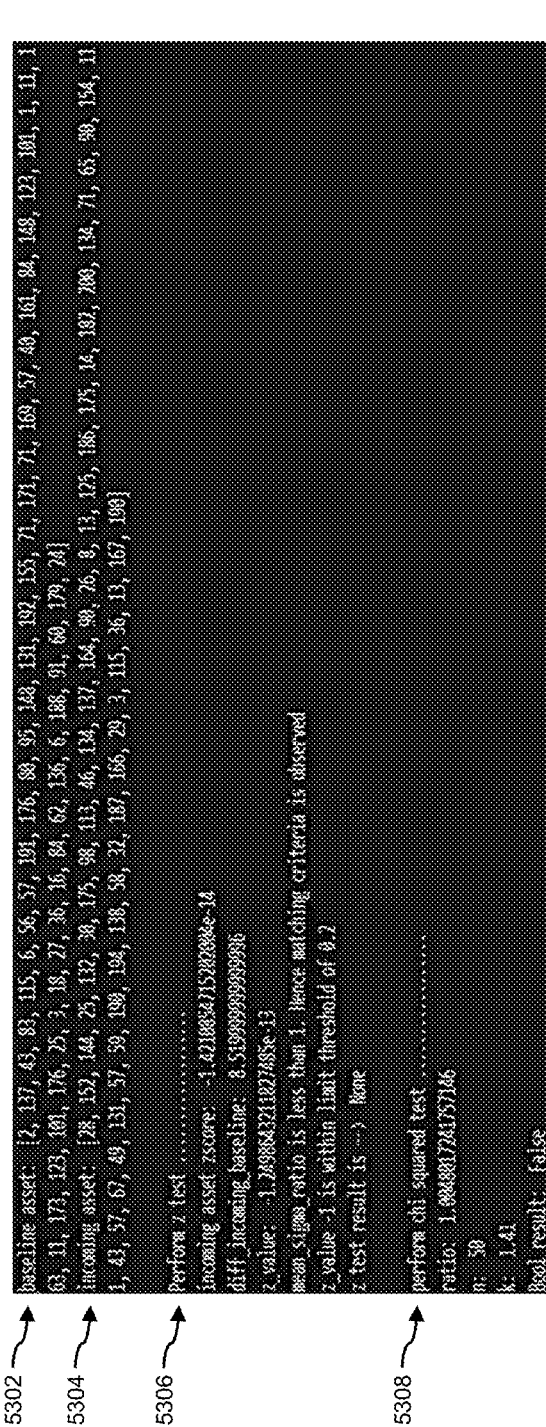
FIG. 5C illustrates an exemplary console rendering details associated with a statistical test in accordance with one or more example embodiments described herein.

FIG. 5C illustrates an exemplary console rendering details associated with a statistical test in accordance with one or more example embodiments described herein. An exemplary console 500C described herein can be rendered on the user interface 5006 (as described in FIG. 5 of the current disclosure). In accordance with some example embodiments, the console 500C renders telemetry data i.e., one or more sensor values 5302 received from a baseline asset. In addition, the console 500C also renders telemetry data i.e., one or more sensor values 5304 received from an incoming asset as well. In this regard, the baseline asset can correspond to the golden asset or the best performing asset in the facility whereas the incoming asset can correspond to an asset at a site of OEM or an asset that is already installed in the facility. In the exemplary console 500C, the one or more sensor values 5302 and 5304 are represented as array of values. However, it is to be noted that the one or more sensor values 5302 and 5304 can be represented in any other form as well. Also, the one or more sensor values 5302 and 5304 represented in the console 500C are exemplary only and the one or more sensor values 5302 and 5304 are not limited to the values represented in the console 500C. In accordance with some example embodiments, length or number of the one or more sensor values 5302 and 5304 in the respective array is same. Further, in accordance with some example embodiments, the statistical analysis component 5104 performs the one or more statistical tests (as described in FIG. 5A of the current disclosure) using the one or more sensor values 5302 and 5304 to identify stationarity between the telemetry data of the baseline asset and the incoming asset. In accordance with some example embodiments, the statistical analysis component 5104 upon performing the one or more statistical tests provide results 5306 and/or 5308 indicating if the incoming asset is matching or not matching with the baseline asset. In this regard, the statistical analysis component 5104 provides the result 5306 upon comparing the mean value and/or the telemetry data of an associated asset with the baseline mean value. Whereas the statistical analysis component 5104 provides the result 5308 upon comparing the standard deviation value and/or the telemetry data of an associated asset with the baseline standard deviation value. The results 5306 and/or 5308 provided by the statistical analysis component 5104 facilitates determination of stationarity and/or second similarity score for the baseline asset and the incoming asset.

Figure 5D:
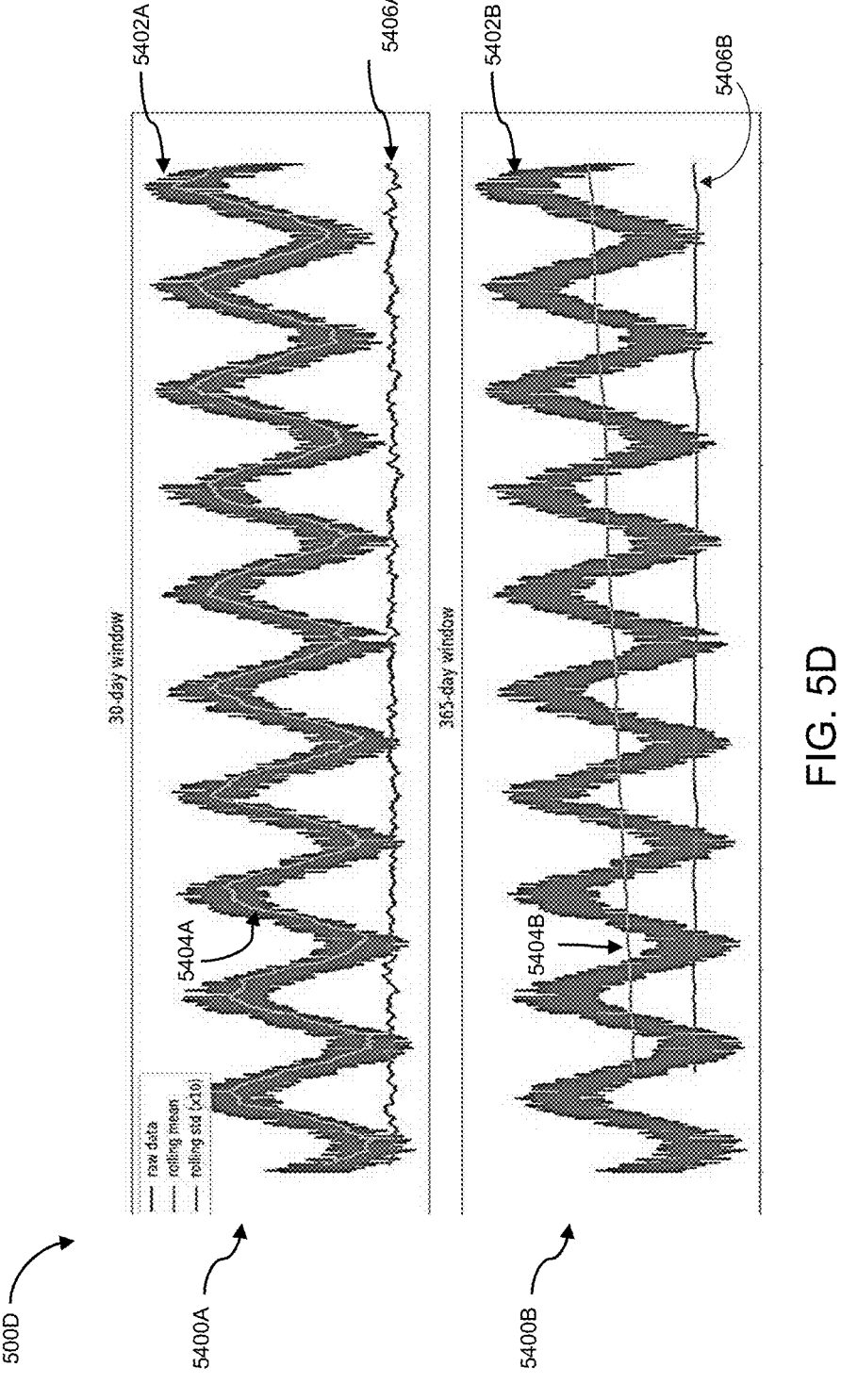
FIG. 5D illustrates an exemplary graphical representation of seasonality, trend, and cyclicity of telemetry data at multiple time frames in accordance with one or more example embodiments described herein.

FIG. 5D illustrates an exemplary graphical representation of seasonality, trend, and cyclicity of telemetry data at multiple time frames in accordance with one or more example embodiments described herein. An exemplary graphical representation 500D described herein comprises two exemplary sub-graphical representations 5400A and 5400B. The exemplary sub-graphical representations 5400A and 5400B are generated by the machine learning component 5106 (as described in FIG. 5A of the current disclosure). In this regard, the time frames selected by the machine learning component 5106 for example, correspond to 30 day and 365 day time frame, respectively. The time frames i.e., 30 days and 365 days described herein are exemplary only and the machine learning component 5106 can select other time frames for applying one or more machine learning models as well. The machine learning component 5106 can select the time frames based on a number of data values of telemetry datasets which is required to apply the one or more machine learning models. As illustrated in the graphical representation 500D, the machine learning component 5106 generates sub-graph 5400A for telemetry data 5402A of 30 day time frame whereas sub-graph 5400B for telemetry data 5402B of 365 day time frame. Further, the machine learning component 5106 determines rolling mean value 5404A for telemetry data 5402A and rolling mean value 5404B for telemetry data 5402B. The rolling mean values 5404A and 5404B facilitate determination of seasonality associated with the respective telemetry datasets 5402A and 5402B. Then, the machine learning component 5106 determines rolling standard value 5406A for telemetry data 5402A and rolling standard value 5406B for telemetry data 5402B. The rolling standard values 5406A and 5406B facilitate determination of trend associated with the respective telemetry datasets 5402A and 5402B.

Figure 6:
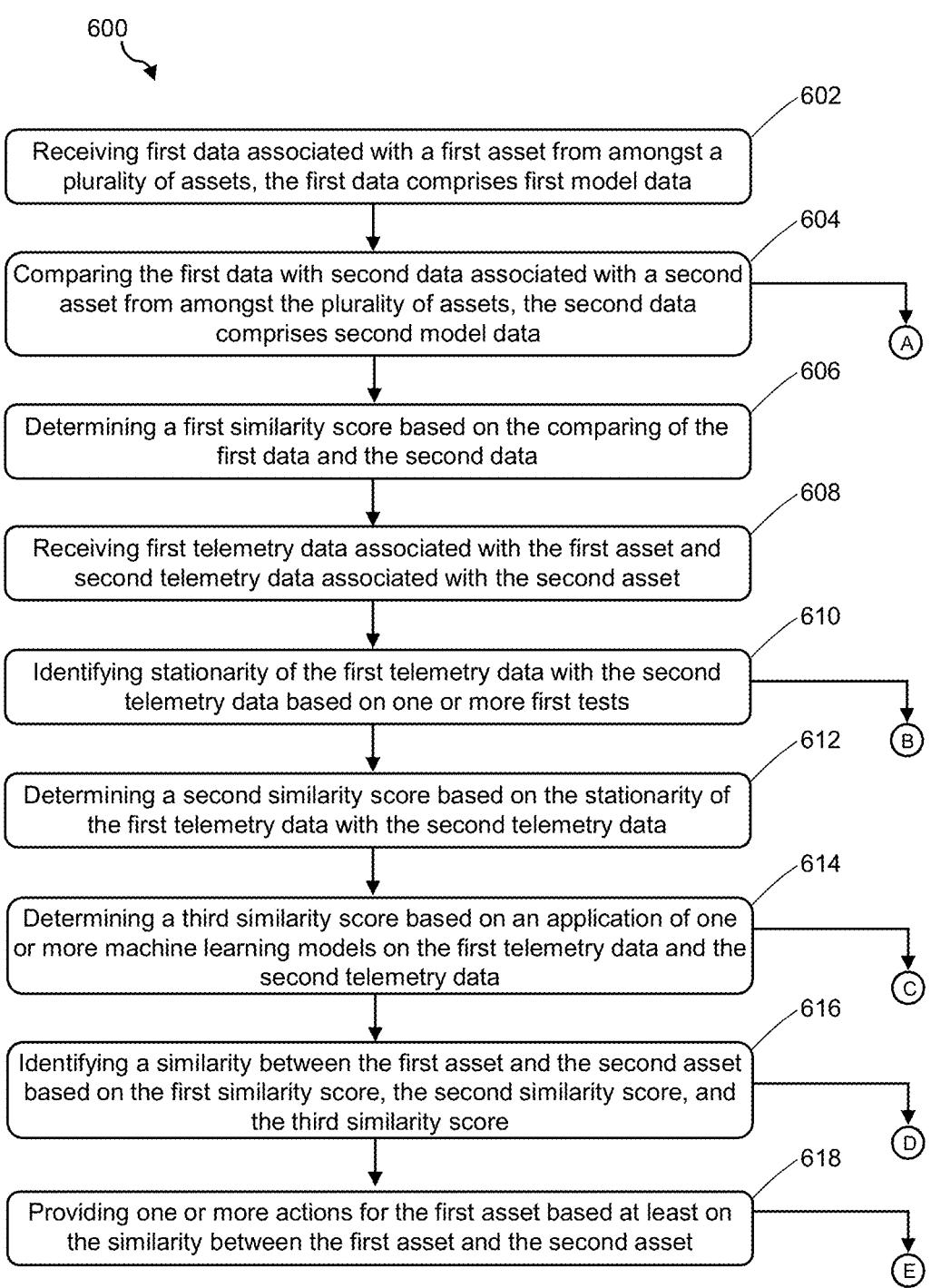
FIG. 6 illustrates a flowchart showing a method described in accordance with some example embodiments described herein.

FIG. 6 illustrates a flowchart showing a method described in accordance with some example embodiments described herein. An exemplary flowchart 600 describes an exemplary method for managing a plurality of assets in a facility via asset management system 500. At step 602, the asset management system 500 includes means, such as data processing component 5002 to receive first data associated with a first asset from amongst a plurality of assets in the facility such that the first data comprises first model data. At step 604, the asset management system 500 includes means, such as comparative analysis component 5004 to compare the first data with second data associated with a second asset from amongst the plurality of assets such that the second data comprises second model data. At step 606, the asset management system 500 includes means, such as the comparative analysis component 5004 to determine a first similarity score based on the comparing of the first data and the second data. Further, at step 608, the asset management system 500 includes means, such as the data processing component 5002 to receive first telemetry data associated with the first asset and second telemetry data associated with the second asset. At step 610, the asset management system 500 includes means, such as the comparative analysis component 5004 to identify stationarity of the first telemetry data with the second telemetry data based on one or more first tests. Further, at step 612, the asset management system 500 includes means, such as the comparative analysis component 5004 to determine a second similarity score based on the stationarity of the first telemetry data with the second telemetry data. At step 614, the asset management system 500 includes means, such as the comparative analysis component 5004 to determine a third similarity score based on an application of one or more machine learning models on the first telemetry data and the second telemetry data. At step 616, the asset management system 500 includes means, such as the comparative analysis component 5004 to identify a similarity between the first asset and the second asset based on the first similarity score, the second similarity score, and the third similarity score. At step 618, the asset management system 500 includes means, such as the comparative analysis component 5004 to provide one or more actions for the first asset based at least on the similarity between the first asset and the second asset.

FIG. 7 illustrates a flowchart showing a method described in accordance with some example embodiments described herein. An exemplary flowchart 700 described herein is implementable via asset management system 500. At step 702, the asset management system 500 includes means, such as comparative analysis component 5004 to compare configuration data in each of first model data and second model data. In this regard, the configuration data comprises: hierarchical information, spatial relationship, geographical information, configuration information, and datasheet information associated with respective first asset and second asset. Further, at step 704, the asset management system 500 includes means, such as the comparative analysis component 5004 to compare parameter data in each of the first model data and the second model data. In this regard, the parameter data comprises: names associated with asset parameters, a type of set point, a role of the set point, relationship between the asset parameters, and statistics associated with the set point and the asset parameters associated with the respective first asset and second asset.

FIG. 8 illustrates a flowchart showing a method described in accordance with some example embodiments described herein. An exemplary flowchart 800 described herein is implementable via asset management system 500. At step 802, the asset management system 500 includes means, such as comparative analysis component 5004 to perform one or more first tests on first telemetry data and second telemetry data. In this regard, the one or more first tests correspond to a Kwiatkowski-Phillips-Schmidt-Shin (KPSS) test and an Augmented Dickey-Fuller (ADF) test. At step 804, the asset management system 500 includes means, such as the comparative analysis component 5004 to compare each of the first telemetry data and the second telemetry data with at least one of a baseline mean value and a baseline standard deviation value. At step 806, the asset management system 500 includes means, such as the comparative analysis component 5004 to determine a comparison score for each of the first telemetry data and the second telemetry data. Further, at step 808, the asset management system 500 includes means, such as the comparative analysis component 5004 to identify a level of similarity of the first telemetry data with the second telemetry data based on the comparison score.

FIG. 9 illustrates a flowchart showing a method described in accordance with some example embodiments described herein. An exemplary flowchart 900 described herein is implementable via asset management system 500. At step 902, the asset management system 500 includes means, such as comparative analysis component 5004 to determine a seasonality, a cyclicity, and a trend associated with each of first telemetry data and second telemetry data based on an application of one or more machine learning models. Further, at step 904, the asset management system 500 includes means, such as the comparative analysis component 5004 to identify a second similarity level between the first telemetry data and the second telemetry data based on the seasonality, the cyclicity, and the trend.

FIG. 10 illustrates a flowchart showing a method described in accordance with some example embodiments described herein. An exemplary flowchart 1000 described herein is implementable via asset management system 500. At step 1002, the asset management system 500 includes means, such as data processing component 5002 to normalize first telemetry data and second telemetry data with metadata based on one or more first tests and one or more machine learning models. Further, at step 1004, the asset management system 500 includes means, such as comparative analysis component 5004 to generate telemetry data for a first asset using the one or more machine learning models if a size of the first telemetry data is less than the second telemetry data.

Figure 11:
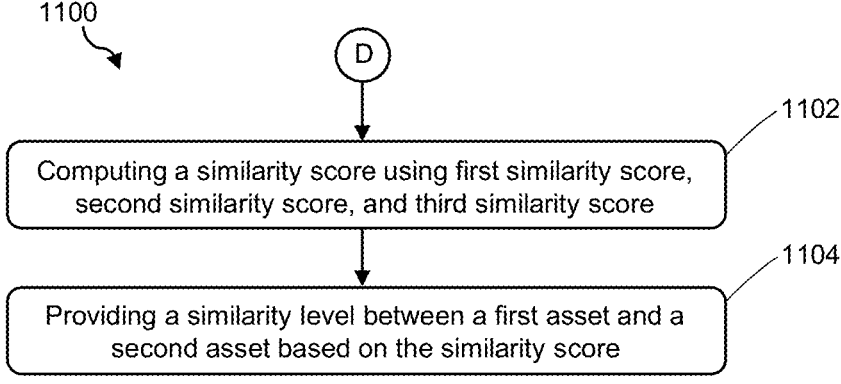
FIG. 11 illustrates a flowchart showing a method described in accordance with some example embodiments described herein.

FIG. 11 illustrates a flowchart showing a method described in accordance with some example embodiments described herein. An exemplary flowchart 1100 described herein is implementable via asset management system 500. At step 1102, the asset management system 500 includes means, such as comparative analysis component 5004 to compute a similarity score using first similarity score, second similarity score, and third similarity score. At step 1104, the asset management system 500 includes means, such as the comparative analysis component 5004 to provide a similarity level between a first asset and a second asset based on the similarity score.

Figure 12:
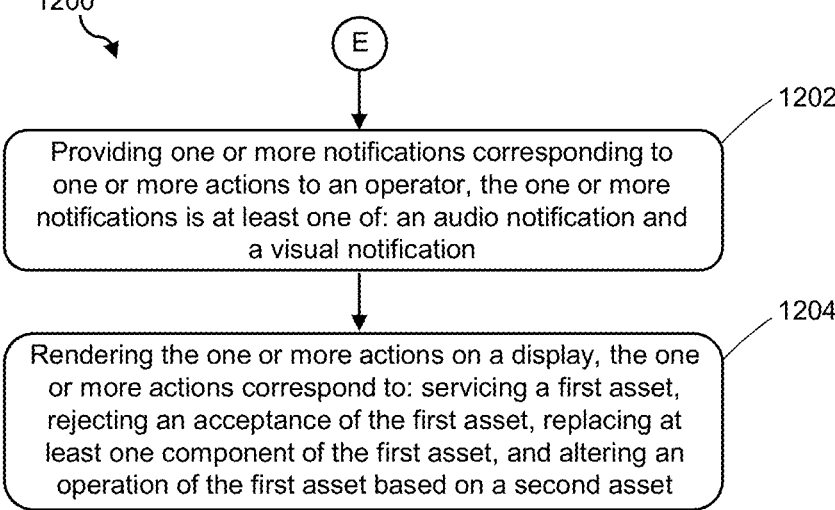
FIG. 12 illustrates a flowchart showing a method described in accordance with some example embodiments described herein.

FIG. 12 illustrates a flowchart showing a method described in accordance with some example embodiments described herein. An exemplary flowchart 1200 described herein is implementable via asset management system 500. At step 1202, the asset management system 500 includes means, such as comparative analysis component 5004 to provide one or more notifications corresponding to one or more actions to an operator. In this regard, the one or more notifications is at least one of: an audio notification and a visual notification. At step 1204, the asset management system 500 includes means, such as user interface 5006 to render the one or more actions on a display. In this regard, the one or more actions correspond to: servicing a first asset, rejecting an acceptance of the first asset, replacing at least one component of the first asset, and altering an operation of the first asset based on a second asset.

Many modifications and other embodiments of the inventions set forth herein will come to mind to one skilled in the art to which these inventions pertain having the benefit of teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for managing a plurality of assets in a facility, the method comprising:

receiving, from one or more sensors associated with the plurality of assets, first data associated with a first asset from amongst the plurality of assets, wherein the first data comprises first model data;

comparing, by one or more processors, the first data with second data associated with a second asset from amongst the plurality of assets, wherein the second data comprises second model data, wherein one or more parameters of the first model data is compared with a corresponding one or more parameters of the second model data;

determining, by the one or more processors, a first similarity score based on the comparison of the one or more parameters of the first data and the second data;

receiving, from the one or more sensors, first telemetry data associated with the first asset and second telemetry data associated with the second asset;

identifying, by the one or more processors, stationarity of the first telemetry data with the second telemetry data based on results of one or more first tests performed on the first telemetry data and the second telemetry data;

determining, by the one or more processors, a second similarity score based on the stationarity of the first telemetry data with the second telemetry data;

determining, by the one or more processors, a third similarity score, wherein the third similarity score is determined based on an application of one or more machine learning models on the first telemetry data and the second telemetry data to identify deviating patterns in different intervals of time between the first and the second asset, and wherein the deviating patterns of the first asset is compared with the second asset to determine the third similarity score;

identifying, by the one or more processors, a similarity between the first asset and the second asset based on the first similarity score, the second similarity score, and the third similarity score, wherein the identified similarity is compared with a predefined performance threshold value to predict one or more faults for the first asset;

providing, by the one or more processors, one or more corrective actions for the first asset based at least on the similarity violating the predefined performance threshold value;

transmitting, by the one or more processors, a control signal to the first asset with the one or more corrective actions; and automatically controlling, by the one or more processors, operation of the first asset based on the one or more corrective actions for the first asset.

2. The method of claim 1, wherein comparing the first data with the second data comprises:

comparing configuration data in each of the first model data and the second model data, wherein the configuration data comprises: hierarchical information, spatial relationship, geographical information, configuration information, and datasheet information associated with the respective first asset and second asset; and comparing parameter data in each of the first model data and the second model data, wherein the parameter data comprises: names associated with asset parameters, a type of set point, a role of the set point, relationship between the asset parameters, and statistics associated with the set point and the asset parameters associated with the respective first asset and second asset.

3. The method of claim 1, wherein identifying the stationarity of the first telemetry data with the second telemetry data comprises:

performing the one or more first tests on the first telemetry data and the second telemetry data, wherein the one or more first tests correspond to a Kwiatkowski-Phillips-Schmidt-Shin (KPSS) test and an Augmented Dickey-Fuller (ADF) test;

comparing each of the first telemetry data and the second telemetry data with at least one of a baseline mean value and a baseline standard deviation value;

determining a comparison score for each of the first telemetry data and the second telemetry data; and identifying a level of similarity of the first telemetry data with the second telemetry data based on the comparison score.

4. The method of claim 1, wherein determining the third similarity score comprises:

determining a seasonality, a cyclicity, and a trend associated with each of the first telemetry data and the second telemetry data based on the application of the one or more machine learning models; and identifying a second similarity level between the first telemetry data and the second telemetry data based on the seasonality, the cyclicity, and the trend.

5. The method of claim 1, further comprising:

normalizing the first telemetry data and the second telemetry data with metadata based on the one or more first tests and the one or more machine learning models; and generating, by the one or more machine learning models, telemetry data for the first asset if a size of the first telemetry data is less than the second telemetry data.

6. The method of claim 1, wherein identifying the similarity between the first asset and the second asset comprises:

computing a similarity score using the first similarity score, the second similarity score, and the third similarity score; and providing a similarity level between the first asset and the second asset based on the similarity score.

7. The method of claim 1, wherein providing the one or more actions for the first asset comprises:

providing one or more notifications corresponding to the one or more actions to an operator, wherein the one or more notifications is at least one of: an audio notification and a visual notification; and rendering, on a display, the one or more actions, wherein the one or more actions correspond to: servicing the first asset, rejecting an acceptance of the first asset, replacing at least one component of the first asset, and altering an operation of the first asset based on the second asset.

8. A system for managing a plurality of assets in a facility, the system comprising:

a processor;

a memory communicatively coupled to the processor, wherein the memory comprises one or more instructions which when executed by the processor, cause the processor to:

receive from one or more sensors associated with the plurality of assets, first data associated with a first asset from amongst the plurality of assets, wherein the first data comprises first model data;

compare the first data with second data associated with a second asset from amongst the plurality of assets, wherein the second data comprises second model data, wherein one or more parameters of the first model data is compared with a corresponding one or more parameters of the second model data;

determine a first similarity score based on the comparison of the one or more parameters of the first data and the second data;

receive first telemetry data associated with the first asset and second telemetry data associated with the second asset;

identify stationarity of the first telemetry data with the second telemetry data based on results of one or more first tests performed on the first telemetry data and the second telemetry data;

determine a second similarity score based on the stationarity of the first telemetry data with the second telemetry data;

determine a third similarity score, wherein the third similarity score is determined based on an application of one or more machine learning models on the first telemetry data and the second telemetry data to identify deviating patterns in different intervals of time between the first and the second asset, and wherein the deviating patterns of the first asset is compared with the second asset to determine the third similarity score;

identify a similarity between the first asset and the second asset based on the first similarity score, the second similarity score, and the third similarity score, wherein the identified similarity is compared with a predefined performance threshold value to predict one or more faults for the first asset;

provide one or more corrective actions for the first asset based at least on the similarity violating the predefined performance threshold value;

transmit, by the one or more processors, a control signal to the first asset with the one or more corrective actions; and automatically control operation of the first asset based on the one or more corrective actions for the first asset.

9. The system of claim 8, wherein the processor is further configured to:

compare configuration data in each of the first model data and the second model data, wherein the configuration data comprises: hierarchical information, spatial relationship, geographical information, configuration information, and datasheet information associated with the respective first asset and second asset; and compare parameter data in each of the first model data and the second model data, wherein the parameter data comprises: names associated with asset parameters, a type of set point, a role of the set point, relationship between the asset parameters, and statistics associated with the set point and the asset parameters associated with the respective first asset and second asset.

10. The system of claim 8, wherein the processor is further configured to:

perform the one or more first tests on the first telemetry data and the second telemetry data, wherein the one or more first tests correspond to a Kwiatkowski-Phillips-Schmidt-Shin (KPSS) test and an Augmented Dickey-Fuller (ADF) test;

compare each of the first telemetry data and the second telemetry data with at least one of a baseline mean value and a baseline standard deviation value, determine a comparison score for each of the first telemetry data and the second telemetry data; and identify a level of similarity of the first telemetry data with the second telemetry data based on the comparison score.

11. The system of claim 8, wherein the processor is further configured to:

determine a seasonality, a cyclicity, and a trend associated with each of the first telemetry data and the second telemetry data based on the application of the one or more machine learning models; and identify a second similarity level between the first telemetry data and the second telemetry data based on the seasonality, the cyclicity, and the trend.

12. The system of claim 8, wherein the processor is further configured to:

normalize the first telemetry data and the second telemetry data with metadata based on the one or more first tests and the one or more machine learning models; and generate using the one or more machine learning models, telemetry data for the first asset if a size of the first telemetry data is less than the second telemetry data.

13. The system of claim 8, wherein the processor is further configured to:

compute a similarity score using the first similarity score, the second similarity score, and the third similarity score; and provide a similarity level between the first asset and the second asset based on the similarity score.

14. The system of claim 8, wherein the processor is further configured to:

provide one or more notifications corresponding to the one or more actions to an operator, wherein the one or more notifications is at least one of: an audio notification and a visual notification; and render, on a display, the one or more actions, wherein the one or more actions correspond to: servicing the first asset, rejecting an acceptance of the first asset, replacing at least one component of the first asset, and altering an operation of the first asset based on the second asset.

15. A non-transitory, computer-readable storage medium having stored thereon executable instructions that, when executed by one or more processors, cause the one or more processors to:

receive, from one or more sensors associated with the plurality of assets, first data associated with a first asset from amongst a plurality of assets, wherein the first data comprises first model data;

compare the first data with second data associated with a second asset from amongst the plurality of assets, wherein the second data comprises second model data, wherein one or more parameters of the first model data is compared with a corresponding one or more parameters of the second model data;

determine a first similarity score based on the comparison of the one or more parameters of the first data and the second data;

receive first telemetry data associated with the first asset and second telemetry data associated with the second asset;

identify stationarity of the first telemetry data with the second telemetry data based on results of one or more first tests performed on the first telemetry data and the second telemetry data;

determine a second similarity score based on the stationarity of the first telemetry data with the second telemetry data;

determine a third similarity score, wherein the third similarity score is determined based on an application of one or more machine learning models on the first telemetry data and the second telemetry data to identify deviating patterns in different intervals of time between the first and the second asset, and wherein the deviating patterns of the first asset is compared with the second asset to determine the third similarity score;

identify a similarity between the first asset and the second asset based on the first similarity score, the second similarity score, and the third similarity score, wherein the identified similarity is compared with a predefined performance threshold value to predict one or more faults for the first asset;

provide one or more corrective actions for the first asset based at least on the similarity violating the predefined performance threshold value;

transmit a control signal to the first asset with the one or more corrective actions; and automatically control operation of the first asset based on the one or more corrective actions for the first asset.

16. The non-transitory, computer-readable storage medium of claim 15, wherein the one or more processors is further configured to:

compare configuration data in each of the first model data and the second model data, wherein the configuration data comprises: hierarchical information, spatial relationship, geographical information, configuration information, and datasheet information associated with the respective first asset and second asset; and compare parameter data in each of the first model data and the second model data, wherein the parameter data comprises: names associated with asset parameters, a type of set point, a role of the set point, relationship between the asset parameters, and statistics associated with the set point and the asset parameters associated with the respective first asset and second asset.

17. The non-transitory, computer-readable storage medium of claim 15, wherein the one or more processors is further configured to:

perform the one or more first tests on the first telemetry data and the second telemetry data, wherein the one or more first tests correspond to a Kwiatkowski-Phillips-Schmidt-Shin (KPSS) test and an Augmented Dickey-Fuller (ADF) test;

compare each of the first telemetry data and the second telemetry data with at least one of a baseline mean value and a baseline standard deviation value;

determine a comparison score for each of the first telemetry data and the second telemetry data; and identify a level of similarity of the first telemetry data with the second telemetry data based on the comparison score.

18. The non-transitory, computer-readable storage medium of claim 15, wherein the one or more processors is further configured to:

determine a seasonality, a cyclicity, and a trend associated with each of the first telemetry data and the second telemetry data based on the application of the one or more machine learning models; and identify a second similarity level between the first telemetry data and the second telemetry data based on the seasonality, the cyclicity, and the trend.

19. The non-transitory, computer-readable storage medium of claim 15, wherein the one or more processors is further configured to:

normalize the first telemetry data and the second telemetry data with metadata based on the one or more first tests and the one or more machine learning models; and generate using the one or more machine learning models, telemetry data for the first asset if a size of the first telemetry data is less than the second telemetry data.

20. The non-transitory, computer-readable storage medium of claim 15, wherein the one or more processors is further configured to:

compute a similarity score using the first similarity score, the second similarity score, and the third similarity score;

provide a similarity level between the first asset and the second asset based on the similarity score; provide one or more notifications corresponding to the one or more actions to an operator, wherein the one or more notifications is at least one of: an audio notification and a visual notification; and render, on a display, the one or more actions, wherein the one or more actions correspond to: servicing the first asset, rejecting an acceptance of the first asset, replacing at least one component of the first asset, and altering an operation of the first asset based on the second asset.

* * * * *